United States Patent
Conner et al.

(10) Patent No.: US 9,097,873 B2
(45) Date of Patent: Aug. 4, 2015

(54) PORT MAPPING IN FIBER OPTIC NETWORK DEVICES

(71) Applicants: Mark Edward Conner, Granite Falls, NC (US); Barton Pierce Filipiak, Hickory, NC (US); Joseph Clinton Jensen, Lawndale, NC (US); Gary Bruce Schnick, Granite Falls, NC (US)

(72) Inventors: Mark Edward Conner, Granite Falls, NC (US); Barton Pierce Filipiak, Hickory, NC (US); Joseph Clinton Jensen, Lawndale, NC (US); Gary Bruce Schnick, Granite Falls, NC (US)

(73) Assignee: Corning Cable Systems LLC, Hickory, NC (US)

( * ) Notice: Subject to any disclaimer, the term of this patent is extended or adjusted under 35 U.S.C. 154(b) by 168 days.

(21) Appl. No.: 13/649,392

(22) Filed: Oct. 11, 2012

(65) Prior Publication Data

US 2014/0105539 A1  Apr. 17, 2014
US 2015/0185420 A9  Jul. 2, 2015

Related U.S. Application Data

(63) Continuation of application No. PCT/US2011/032420, filed on Apr. 14, 2011.

(60) Provisional application No. 61/324,104, filed on Apr. 14, 2010.

(51) Int. Cl.
*G02B 6/36* (2006.01)
*G02B 6/44* (2006.01)

(52) U.S. Cl.
CPC ............ *G02B 6/4471* (2013.01); *G02B 6/4452* (2013.01)

(58) Field of Classification Search
None
See application file for complete search history.

(56) References Cited

U.S. PATENT DOCUMENTS

| | | | |
|---|---|---|---|
| 4,611,887 A | 9/1986 | Glover et al. |
| 4,699,460 A | 10/1987 | Szentesi |
| 5,204,925 A | 4/1993 | Bonanni et al. |
| 5,613,070 A | 3/1997 | Born |
| 6,185,358 B1 | 2/2001 | Park |
| 6,219,479 B1 | 4/2001 | Madden et al. |

(Continued)

FOREIGN PATENT DOCUMENTS

| | | |
|---|---|---|
| CN | 102073109 A | 5/2011 |
| EP | 1065544 A2 | 1/2001 |

(Continued)

OTHER PUBLICATIONS

Final Office Action for U.S. Appl. No. 12/472,849 mailed Dec. 31, 2014, 14 pages.

(Continued)

*Primary Examiner* — Tina Wong
(74) *Attorney, Agent, or Firm* — Brad Christopher Rametta

(57) ABSTRACT

A fiber optic network device comprising an input port adapted to receive a multi-fiber cable having active optical fibers designated in a consecutive sequence is disclosed. A first plurality and a second plurality of optical fibers are disposed within the fiber optic network device. The first plurality of optical fibers aligns to a first section of the consecutive sequence and a second plurality of optical fibers aligns to a second section of the consecutive sequence. A plurality of drop ports in the fiber optic network device are adapted to optically couple ones of the first plurality of optical fibers to at least one drop cable. A pass-through port is adapted to optically couple the second plurality of optical fibers to a second fiber optic network device through a multi-fiber adapter in a central alignment at the pass-through port.

26 Claims, 8 Drawing Sheets

(56) References Cited

U.S. PATENT DOCUMENTS

| | | |
|---|---|---|
| 6,224,269 B1 | 5/2001 | Engstrand et al. |
| 6,275,643 B1 | 8/2001 | Bandy et al. |
| 6,351,582 B1 | 2/2002 | Dyke et al. |
| 6,364,539 B1 | 4/2002 | Shahid |
| 6,402,393 B1 | 6/2002 | Grimes et al. |
| 6,464,404 B1 | 10/2002 | Robinson et al. |
| 6,496,641 B1 | 12/2002 | Mahony |
| 6,501,900 B1 | 12/2002 | Aloisio, Jr. et al. |
| 6,554,483 B1 | 4/2003 | Sun et al. |
| 6,621,975 B2 | 9/2003 | Laporte et al. |
| 6,694,083 B2 | 2/2004 | Paradiso et al. |
| 6,758,600 B2 | 7/2004 | Del Grosso et al. |
| 6,869,227 B2 | 3/2005 | Del Grosso et al. |
| 7,088,981 B2 | 8/2006 | Chang |
| 7,147,383 B2 | 12/2006 | Sullivan |
| 7,237,966 B2 | 7/2007 | Quinby et al. |
| 7,354,202 B1 | 4/2008 | Luger |
| 7,391,952 B1 | 6/2008 | Ugolini et al. |
| 7,542,653 B2 | 6/2009 | Johnson et al. |
| 7,603,044 B1 | 10/2009 | Conroy et al. |
| 7,646,981 B2 | 1/2010 | Coffey |
| 7,689,079 B2 | 3/2010 | Burnham et al. |
| 7,756,371 B1 | 7/2010 | Burnham et al. |
| 8,009,959 B2 | 8/2011 | Barnes et al. |
| 8,251,591 B2 | 8/2012 | Barnes et al. |
| 8,821,036 B2 | 9/2014 | Shigehara |
| 2002/0015563 A1 | 2/2002 | Murakami et al. ............. 385/53 |
| 2002/0181925 A1 | 12/2002 | Hodge et al. |
| 2003/0044141 A1 | 3/2003 | Melton et al. |
| 2003/0072537 A1 | 4/2003 | Eichenberger et al. |
| 2003/0210861 A1 | 11/2003 | Weiss et al. |
| 2004/0062498 A1 | 4/2004 | Del Grosso et al. |
| 2004/0179771 A1 | 9/2004 | Verhagen et al. |
| 2004/0184741 A1 | 9/2004 | Del Grosso et al. |
| 2005/0036749 A1 | 2/2005 | Vogel et al. |
| 2005/0152640 A1 | 7/2005 | Lemoff |
| 2005/0163448 A1 | 7/2005 | Blackwell, Jr. et al. ...... 385/135 |
| 2005/0207709 A1* | 9/2005 | Del Grosso et al. ............ 385/71 |
| 2006/0029334 A1 | 2/2006 | Quinby et al. .................. 385/59 |
| 2006/0034573 A1 | 2/2006 | Guan et al. |
| 2006/0045521 A1 | 3/2006 | Emery et al. |
| 2006/0133736 A1 | 6/2006 | Sullivan |
| 2006/0228070 A1* | 10/2006 | Davis et al. ..................... 385/16 |
| 2006/0269208 A1 | 11/2006 | Allen et al. |
| 2006/0280420 A1 | 12/2006 | Blackwell, Jr. et al. |
| 2007/0071392 A1 | 3/2007 | Baucom et al. |
| 2007/0189694 A1 | 8/2007 | Mullaney et al. |
| 2008/0152292 A1 | 6/2008 | Wilken et al. |
| 2008/0175548 A1 | 7/2008 | Knecht et al. |
| 2008/0193091 A1 | 8/2008 | Herbst |
| 2008/0205824 A1 | 8/2008 | Cody et al. |
| 2008/0279506 A1 | 11/2008 | Kerry et al. |
| 2009/0103879 A1 | 4/2009 | Tang et al. |
| 2009/0154888 A1 | 6/2009 | Abbott, III et al. |
| 2009/0169163 A1 | 7/2009 | Abbott, III et al. |
| 2009/0180737 A1 | 7/2009 | Burnham et al. |
| 2009/0263089 A1 | 10/2009 | Keller et al. |
| 2009/0290844 A1 | 11/2009 | Mullaney et al. |
| 2010/0092129 A1 | 4/2010 | Conner |
| 2010/0092133 A1 | 4/2010 | Conner |
| 2010/0092146 A1 | 4/2010 | Conner et al. |
| 2010/0092169 A1* | 4/2010 | Conner et al. .................. 398/43 |
| 2010/0092171 A1 | 4/2010 | Conner |
| 2010/0098386 A1 | 4/2010 | Kleeberger |
| 2010/0195955 A1 | 8/2010 | Burnham et al. |
| 2010/0303408 A1* | 12/2010 | Conner et al. .................. 385/24 |
| 2010/0322554 A1 | 12/2010 | Barnes et al. |
| 2011/0103803 A1 | 5/2011 | Kolesar |
| 2011/0129226 A1 | 6/2011 | Vleugels et al. |
| 2011/0274400 A1 | 11/2011 | Mudd et al. |
| 2011/0293277 A1 | 12/2011 | Bradea et al. |
| 2012/0189259 A1 | 7/2012 | Manes |
| 2012/0288233 A1 | 11/2012 | Barnes et al. |
| 2013/0163932 A1 | 6/2013 | Cooke et al. |
| 2014/0029909 A1 | 1/2014 | Rhoney et al. |
| 2014/0140660 A1 | 5/2014 | Buff et al. |
| 2014/0254986 A1 | 9/2014 | Kmit et al. |

FOREIGN PATENT DOCUMENTS

| | | | |
|---|---|---|---|
| WO | 0244782 A2 | 6/2002 | |
| WO | 03016975 A2 | 2/2003 | |
| WO | 2005114286 A1 | 12/2005 | ............... G02B 6/44 |
| WO | 2010044979 A1 | 4/2010 | ............... G02B 6/44 |
| WO | 2010093794 A1 | 8/2010 | ............... G02B 6/44 |
| WO | 2011053409 A1 | 5/2011 | |

OTHER PUBLICATIONS

Non-Final Office Action for U.S. Appl. No. 14/448,252 mailed Dec. 4, 2014, 12 pages.
Notice of Allowance for U.S. Appl. No. 12/323,395 mailed Jan. 7, 2015, 6 pages.
Final Office Action for U.S. Appl. No. 13/559,070 mailed Jan. 13, 2015, 8 pages.
Author Unknown, "Parallel Optics," Applications Engineering Note 123, Rev 0, Corning Cable Systems LLC, Mar. 23, 2008, 4 pages.
Author Unknown, "Fiber Systems: Best Practices for Ensuring Polarity of Array-Based Fiber Optic Channels," White Paper, Panduit Corp., 2008, 10 pages.
Stewart, "Optical Assembly Plant: Base 8 Ribbon Module Jumper "Classic"," Flyer 0000009429-EN, Corning Cable Systems, Jan. 23, 2008, 1 page.
Author Unknown, "Data Center Fabric: Corning Cable Systems Optical Cabling Solutions for Brocade," Technical Brief, GA-TB-052-01, Brocade Communications Systems, Inc., Sep. 2008, 26 pages.
Author Unknown, "U-Space System for Brocade 48000," Product Specifications, LAN-904-EN, Corning Cable Systems LLC, Apr. 2008, 16 pages.
Author Unknown, "U-Space System for Brocade SAN Directors," Specification Sheet, LAN-904-EN, Corning Cable Systems LLC, Oct. 2010, 8 pages.
Author Unknown, "Base 8 Modules," Standard Recommended Procedure 003-121, Issue 1, Corning Cable Systems LLC, Apr. 2008, 3 pages.
Author Unknown, "QSFP (Quad Small Formfactor Pluggable) Transceiver," INF-8438i Specification, SFF Committee, Rev 1.0, Nov. 2006, 75 pages.
Non-final Office Action for U.S. Appl. No. 12/288,231 mailed May 25, 2011, 10 pages.
Final Office Action for U.S. Appl. No. 12/288,231 mailed Nov. 14, 2011, 6 pages.
Advisory Action for U.S. Appl. No. 12/288,231 mailed Apr. 5, 2012, 3 pages.
Non-final Office Action for U.S. Appl. No. 12/288,231 mailed Feb. 13, 2014, 7 pages.
Non-final Office Action for U.S. Appl. No. 12/323,356 mailed Sep. 30, 2011, 15 pages.
Final Office Action for U.S. Appl. No. 12/323,356 mailed Mar. 2, 2012, 18 pages.
Notice of Allowance for U.S. Appl. No. 12/323,356 mailed Jan. 17, 2014, 7 pages.
Non-final Office Action for U.S. Appl. No. 12/323,385 mailed Sep. 21, 2011, 10 pages.
Final Office Action for U.S. Appl. No. 12/323,385 mailed Mar. 6, 2012, 12 pages.
Advisory Action for U.S. Appl. No. 12/323,385 mailed Jun. 15, 2012, 2 pages.
Non-final Office Action for U.S. Appl. No. 10/805,892 mailed Aug. 10, 2004, 4 pages.
Notice of Allowance for U.S. Appl. No. 10/805,892 mailed Dec. 21, 2004, 5 pages.
Non-final Office Action for U.S. Appl. No. 11/020,730 mailed Feb. 28, 2006, 6 pages.
Notice of Allowance for U.S. Appl. No. 11/020,730 mailed Sep. 20, 2006, 7 pages.

(56) References Cited

OTHER PUBLICATIONS

Non-final Office Action for U.S. Appl. No. 12/472,849 mailed Oct. 12, 2011, 9 pages.
Non-final Office Action for U.S. Appl. No. 12/472,849 mailed Aug. 20, 2012, 9 pages.
Final Office Action for U.S. Appl. No. 12/472,849 mailed May 13, 2013, 15 pages.
Advisory Action and Examiner-Initiated Interview Summary for U.S. Appl. No. 12/472,849 mailed Aug. 5, 2013, 5 pages.
Non-final Office Action for U.S. Appl. No. 12/472,849 mailed Oct. 9, 2013, 14 pages.
Non-final Office Action for U.S. Appl. No. 12/472,849 mailed May 23, 2014, 13 pages.
Non-final Office Action for U.S. Appl. No. 12/486,427 mailed Mar. 5, 2010, 5 pages.
Notice of Allowance for U.S. Appl. No. 12/486,427 mailed Aug. 27, 2010, 6 pages.
Notice of Allowance for U.S. Appl. No. 12/486,427 mailed Jun. 13, 2011, 7 pages.
Non-final Office Action for U.S. Appl. No. 12/486,427 mailed Oct. 21, 2010, 5 pages.
Notice of Allowance for U.S. Appl. No. 12/486,473 mailed May 29, 2012, 8 pages.
Non-final Office Action for U.S. Appl. No. 12/486,473 mailed Sep. 29, 2011, 4 pages.
Non-final Office Action for U.S. Appl. No. 12/323,344 mailed Aug. 18, 2011, 8 pages.
Notice of Allowance for U.S. Appl. No. 12/323,344 mailed Jan. 9, 2012, 9 pages.
Non-final Office Action for U.S. Appl. No. 12/323,395 mailed Dec. 8, 2011, 7 pages.
Non-final Office Action for U.S. Appl. No. 12/323,395 mailed Apr. 17, 2014, 15 pages.
Final Office Action for U.S. Appl. No. 12/323,395, mailed Oct. 9, 2014, 10 pages.
Quayle Action for U.S. Appl. No. 13/557,671 mailed Dec. 6, 2013, 4 pages.
Notice of Allowance for U.S. Appl. No. 13/557,671 mailed Jun. 25, 2014, 6 pages.
Applicant-Initiated Interview Summary for U.S. Appl. No. 13/557,671, mailed Oct. 9, 2014, 3 pages.
Non-final Office Action for U.S. Appl. No. 13/559,070 mailed Sep. 27, 2012, 7 pages.
Non-final Office Action for U.S. Appl. No. 13/751,232 mailed Sep. 17, 2014, 8 pages.
Non-final Office Action for U.S. Appl. No. 13/559,070 mailed Apr. 3, 2014, 8 pages.
Final Office Action for U.S. Appl. No. 13/559,070 mailed Oct. 1, 2013, 8 pages.
International Search Report for PCT/US2009/056880 mailed Nov. 9, 2009, 3 pages.
International Search Report for PCT/US2009/057128 mailed Nov. 9, 2009, 3 pages.
International Search Report for PCT/US2009/057140 mailed Nov. 9, 2009, 3 pages.
International Search Report for PCT/US2009/057244 mailed Nov. 9, 2009, 4 pages.
International Preliminary Report on Patentability for PCT/US2009/057244 mailed Apr. 19, 2011, 7 pages.
International Search Report for PCT/US2010/035939 mailed Aug. 16, 2010, 2 pages.
International Search Report for PCT/US2013/051424 mailed Oct. 21, 2013, 4 pages.
International Search Report for PCT/US2013/069548 mailed Feb. 6, 2014, 4 pages.
Tanji et al., "Optical Fiber Cabling Technologies for Flexible Access Network," Optical Fiber Technology, Academic Press, London, US, vol. 14, No. 3, Jul. 1, 2008, 8 pages.
Author Unknown, "High Density PARA-OPTIX Cable Assemblies and Enclosures," Tyco Electronics, 2007, 2 pages.
Kolesar et al., "Clause 86 MDI Optical Pin Layout and Connector," IEEE P802.3ba, Jan. 2009, 24 pages.
Author Unknown, "TIA Standard: Optical Fiber Cabling Components Standard," TIA-568-C.3, Telecommunications Industry Association, Jun. 2008, 38 pages.
International Preliminary Report on Patentability for PCT/US2013/051424 mailed Feb. 5, 2015, 9 pages.
Notice of Allowance for U.S. Appl. No. 13/557,671 mailed Feb. 17, 2015, 7 pages.
Final Office Action for U.S. Appl. No. 13/751,232 mailed Jan. 23, 2015, 11 pages.

* cited by examiner

PORT MAPPING IN FIBER OPTIC NETWORK DEVICES

PRIORITY APPLICATION

This application is a continuation of International Application No. PCT/US11/32420 filed Apr. 14, 2011, which claims the benefit of priority to U.S. Application No. 61/324,104, filed Apr. 14, 2010, both applications being incorporated herein by reference.

BACKGROUND

The present invention relates generally to fiber optic network devices, and more particularly to port mapping in fiber optic network devices to facilitate consistent, sequential optical connector terminations at a fiber distribution terminal.

Optical fiber is increasingly being used for a variety of broadband applications including voice, video and data transmissions. As a result of the ever-increasing demand for broadband communications, telecommunication and cable media service providers and/or operators are expanding their fiber optic networks to increase their networks' capacity and reach to provide more services, applications and information to more proximate and distant subscribers. To facilitate this capacity and reach, the fiber optic networks must employ additional fiber optic cable, hardware and components resulting in increased installation time, cost and maintenance. This results in the fiber optic networks becoming more complex, requiring architectures that allow for the most efficient delivery of fiber optic service to the subscriber. These architectures typically employ fiber optic network devices, such as optical connection terminals, for example, in branches of the fiber optic network. The fiber optic network devices act to optically interconnect the fiber optic cables of the branch, separate or combine optical fibers in multi-fiber cables, and/or split or couple optical signals, as may be necessary.

For example, a multi-fiber feeder cable from a central office or a transport cable from a head end, may connect to multiple multi-fiber distribution cables. Each distribution cable then may extend to a designated geographic area, thereby providing the optical service to subscribers in that area. A fiber optic drop cable from the subscriber premises may connect to the distribution cable to establish optical connectivity between the service provider and the subscriber in a fiber to the premises (FTTP) optical network. However, extending the drop cable from the subscriber premises all the way to the distribution cable may require a substantial length of drop cable resulting in extensive cost and installation time. Moreover, the cost and installation time would be increased and compounded if a separate connection to the distribution cable was needed for each drop cable. To reduce the attendant cost and timing, while still maintaining optical connectivity between the distribution cable and the drop cable, and, thereby, between the service provider and the subscriber, one or more intermediate optical connection points, between the distribution cable and the drop cable may be incorporated.

SUMMARY

Embodiments disclosed in the detailed description include a fiber optic network device comprising an input port adapted to receive a multi-fiber cable having active optical fibers designated in a consecutive sequence. A first plurality of optical fibers is disposed within the fiber optic network device and extends from the input port. The first plurality of optical fibers aligns to a first section of the consecutive sequence. A second plurality of optical fibers is disposed within the fiber optic network device and extends from the input port. The second plurality of optical fibers aligns to a second section of the consecutive sequence. A plurality of drop ports open into the fiber optic network device. The plurality of drop ports are adapted to optically couple ones of the first plurality of optical fibers to at least one drop cable external to the fiber optic network device. A pass-through port is included in the fiber optic network device and adapted to optically couple the second plurality of optical fibers to a second fiber optic network device through a multi-fiber adapter. The multi-fiber adapter has a plurality of connection ports such that the second plurality of optical fibers optically connects to the plurality of connection points in a central alignment at the pass-through port.

In another aspect, a fiber optic network is disclosed. The fiber optic network may include a first fiber optic network device, with a terminal field having a plurality of connection terminals in a consecutive sequence. The connection terminate are adapted to receive and terminate optical fibers. The fiber optic network may also include a second fiber optic network device with an input port adapted to receive a first multi-fiber cable having active optical fibers in the consecutive sequence. A first plurality of optical fibers disposed within the second fiber optic network device extend from the input port, and align to a first section of the consecutive sequence. A second plurality of optical fibers disposed within the second fiber optic network device extend from the input port and align to a second section of the consecutive sequence. A third plurality of optical fibers disposed within the second fiber optic network device extend from the input port and align to a third section of the consecutive sequence.

A first plurality of drop ports opening into the second fiber optic network device are adapted to optically couple ones of the first plurality of optical fibers to at least one drop cable external to the fiber optic network device according to a first port mapping scheme. A first pass-through port in the second fiber optic network device is adapted to optically couple the second plurality of optical fibers to a third fiber optic network device through a multi-fiber adapter having a plurality of connection ports. The second plurality of optical fibers optically connect to the plurality of connection ports in a central alignment at the first pass-through port according to a second port mapping scheme. A second pass-through port is adapted to optically couple the third plurality of optical fibers to a fourth fiber optic network device through a multi-fiber adapter having a plurality of connection ports. The third plurality of optical fibers optically connect to the plurality of connection ports in a central alignment at the second pass-through port according to a third port mapping scheme. Additionally, individual or multiple, for example pairs of, optical fibers may extend to a drop port according to the port mapping scheme.

The third fiber optic network device may include an input port adapted to receive a multi-fiber cable. A fourth plurality of optical fibers disposed within the third fiber optic network device extend from the input port and align to the second section of the consecutive sequence. A second plurality of drop ports opening into the third fiber optic network device are adapted to optically couple ones of the fourth plurality of optical fibers to at least one drop cable external to the third fiber optic network device, according to a fourth port mapping scheme.

In another aspect, a method of installing fiber optic network devices in a fiber optic network is disclosed. The method includes providing a first fiber optic network device, a second fiber optic network device, and a third fiber optic network device. The first fiber optic network device has a terminal field having a plurality of connection terminals. The connection terminals are adapted to receive and terminate optical fibers. The second fiber optic network device has a first plurality of drop ports. The first plurality of drop ports are adapted to optically couple ones of a first plurality of optical fibers disposed in the second fiber optic network device to at least one drop cable external to the second fiber optic network device. The third fiber optic network device has a second plurality of drop ports adapted to optically couple ones of a second plurality of optical fibers disposed in the third fiber optic network device to at least one drop cable external to the third fiber optic network device. The method further includes terminating at the connection terminal the first plurality of optical fibers, and activating optical signaling between the connection terminal and the first plurality of drop ports through the first plurality of optical fibers. The method further includes terminating at the connection terminal the second plurality of optical fibers while the optical signaling between the connection terminal and the first plurality of drop ports is active, and activating optical signaling between the connection terminal and the second plurality of drop ports through the second plurality of optical fibers.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description are merely exemplary embodiments, and are intended to provide an overview or framework for understanding the nature and character of the invention as it is claimed.

The accompanying drawings are included to provide a further understanding of the principles of the invention, and are incorporated into and constitute a part of this specification. The drawings illustrate one or more embodiment(s), and together with the description serve to explain the principles and operation of the invention. It is to be understood that various features of the invention disclosed in this specification and in the drawings can be used in any and all combinations.

DETAILED DESCRIPTION

Figure 1:
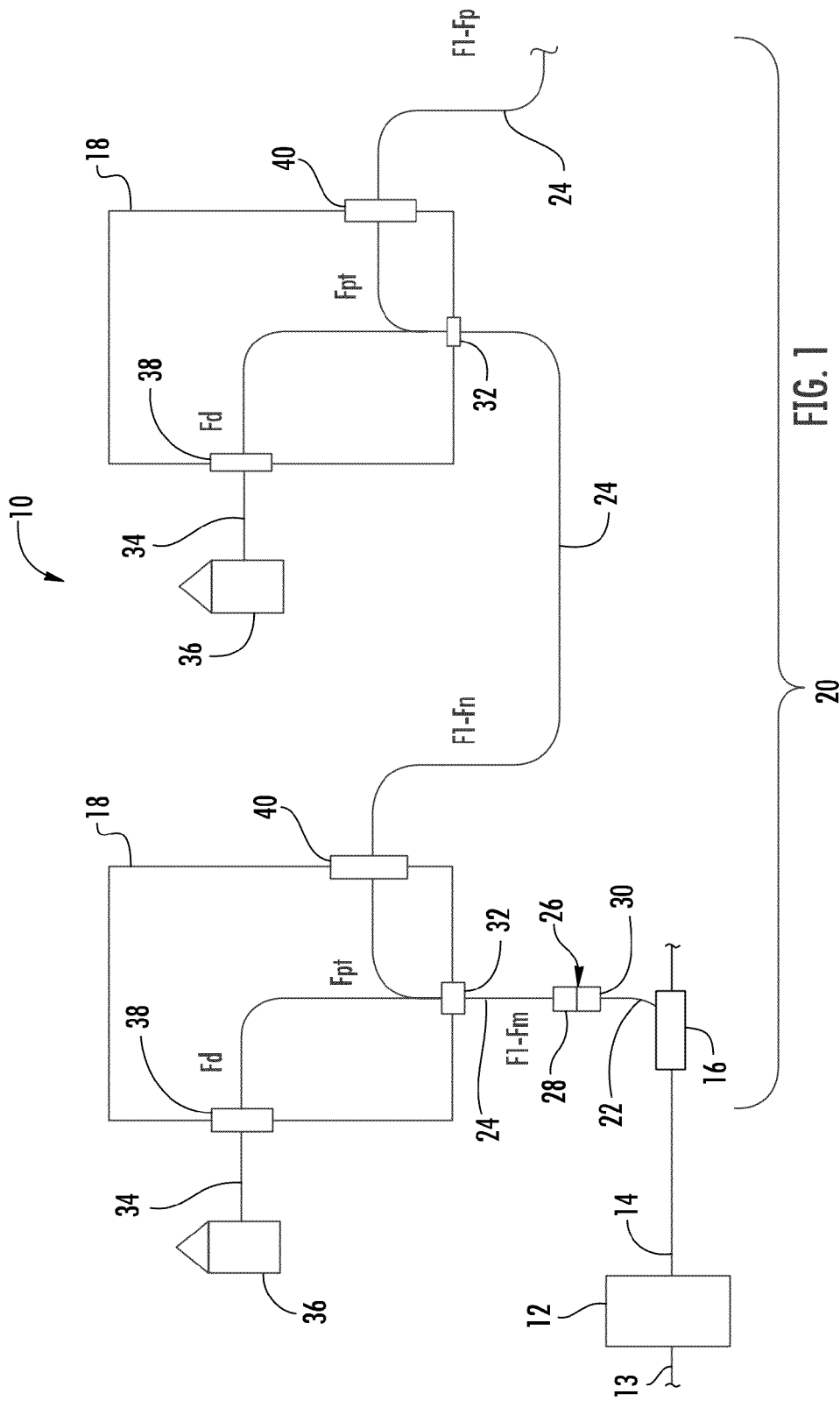
FIG. 1 is a schematic diagram of a portion of a fiber optic network according to an exemplary embodiment.

In the following detailed description, for purposes of explanation and not limitation, example embodiments disclosing specific details are set forth to provide a thorough understanding of the principles of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the principles of the present invention. Finally, wherever applicable, like reference numerals refer to like elements.

Various embodiments of a fiber optic network device positioned in a fiber optic network and having a port mapping scheme are provided. To facilitate the description of the various embodiments, an optical connection terminal may be used. It should be understood that as used herein the term optical connection terminal is not limited to any specific type, style, structure, construction or arrangement of fiber optic network device. Accordingly, for purposes herein optical connection terminal shall mean and include, but is not limited to, devices and/or structures which may typically be referred to as a fiber distribution terminal, a local convergence point, a fiber distribution hub, a fiber distribution cabinet, a splitter cabinet, a multiport, a fiber terminal, a multiple dwelling closure, a local convergence cabinet, a pedestal, a network access point, a distribution closure, and the like.

Further, as used herein and well known and understood in the art, the term "drop cable" shall mean and include a fiber optic cable from a subscriber premises. Also, the term "distribution cable" shall mean and include any one or more of fiber optic cables in the form of a feeder cable from a central office of a telecommunications service provider or operator, a transport cable from a head end of cable media service provider or operator, as well as a fiber optic cable that may be optically connected to a feeder cable or a transport cable and used to further distribute the optical services toward a subscriber premises. The term "branch cable" shall mean and include any fiber optic cable, including but not limited to, a tether cable and/or a stub cable, as those terms are known in the art, and any other cable that may optically connect to and/or extend from a distribution cable for the purpose of optically connecting the distribution cable to a drop cable. The distribution cable, branch cable and/or drop cable may be any type of fiber optic cable having one or more optical fibers.

The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated. In addition, the optical fibers may be color-coded. The color-coding may be in accordance with TIA/EIA 598 "Optical Fiber Cable Color Coding," which provides for color-coding optical fibers of the first 12 fibers in an fiber optic cable in the following sequence: F1—blue (BL), F2—orange (OR), F3—green (GR), F4—brown (BR), F5—slate (SL), F6—white (WH), F7—(RD), F8—black (BK), F9—yellow (YL), F10—violet (VI), F11—rose (RS), and F12—aqua (AQ). The designations F1 through F12 refer to position designations that will be used for purposes of explaining the embodiments in this disclosure.

The drop cable may be, "pre-connectorized" to be readily connected to and disconnected from a drop port of the optical connection terminal. At the other end, the drop cable may be optically coupled to optical fibers within a conventional closure, such as, but not limited to, a network interface device (NID) of the types available from Corning Cable Systems LLC of Hickory, N.C. In the exemplary embodiments shown and described herein, the drop cables extend from a closure located at a subscriber premises and are optically coupled through the drop ports of the optical connection terminal to one or more optical fibers of a branch cable and/or may be optically connected to the branch cable through an optical device, such as a splitter, wave division multiplexer WDM, or the like. Thus, individual drop cables may optically couple to respective individual optical fibers, and/or an individual drop cable may optically couple to more than one optical fibers. In turn, the optical fibers of the branch cable, or optically connected to the branch cable, are optically coupled to optical fibers of the distribution cable, at a mid-span access location on the distribution cable. The mid-span access location may be provided at an aerial closure, a buried closure (also referred to as a below grade closure) or an above ground telecommunications cabinet, terminal, pedestal, or the like. Likewise, the optical connection terminal may be provided at an aerial location, such as mounted to an aerial strand between utility poles or mounted on a utility pole, at a buried location, such as within a hand-hole or below grade vault, or at an above-ground location, such as within a cabinet, terminal, pedestal, above grade vault, or the like. Thus, the optical connection terminal provides an accessible interconnection terminal for readily connecting, disconnecting or reconfiguring drop cables in the optical network, and in particular, for optically coupling drop cables with a distribution cable. The terms connect, interconnect, and couple shall be understood to mean, without limitation, the passage, flow, transmission, or the like of an optical signal between one or more of optical cables, optical fibers, components, and/or connectors, or the like and one or more of optical cables, optical fibers, components, and/or connectors, or the like; whether or not by direct or indirect physical connection, to establish optical communication or connectivity.

A branching point may be established at a mid-span access location and/or at the end of a distribution cable. For purposes herein, reference to mid-span access location shall be understood to also include the end of the distribution cable. The distribution cable may extend from a distribution point, such as a distribution cabinet, fiber distribution hub, local convergence cabinet, or the like. At the distribution point the distribution cable may optically connect to a feeder cable extended from a central office or a transport cable from a head end, as the case may be.

The direction in the fiber optic network toward or facing the central office or head end may be referred to as "upstream" and the direction facing away from the central office or head end may be referred to as "downstream." It should be understood, though, that using the terms "upstream" or "downstream" does not indicate the direction in which the optical signals are transmitted or carried in the optical fibers. Thus, an optical signal may be transmitted in both the upstream or downstream direction.

Due to the port mapping scheme more than one optical connection terminal may be included in the branch. Because more than one optical connection terminal may be included in the branch, distributed, hierarchical architectures may be employed to position the optical connection terminals at more convenient locations with respect to the subscriber premises. As a result, drop cables extending from a subscriber premises may be optically coupled to the fiber optic network at an optical connection terminal more closely located to the subscriber premises as opposed to an optical connection terminal located more distantly or at the actual mid-span access location provided on the distribution cable. Thus, the overall length of the drop cables may be substantially reduced.

Referring now to FIG. 1, there is shown an exemplary embodiment of optical connection terminals configured with a port mapping scheme in a fiber optic network 10, which may be at any point in the fiber optic network, near to or distant from the central office or head end. The fiber optic network 10 comprises a distribution terminal 12 which may receive a feeder/transport cable 13 from the central office or head end (not shown). A distribution cable 14 extends from the distribution terminal 12 to a branching point 16 and to multiple optical connection terminals 18, only two of which are shown in FIG. 1. The branching point 16 provides a branch point for branch 20. A tether cable 22 extends from the branching point 16. The tether cable 22 comprises optical fibers of the distribution cable 14 split off from the distribution cable 14. The optical fibers in the tether cable 22 optically connect to the optical fibers in a branch cable 24 through network connection 26. In this way, the optical fibers of the branch cable 24 may be optically connected to the optical fibers of the distribution cable 14, and optical coupling of the branch 18 to the distribution terminal 12 may be established through the distribution cable 14.

The network connection 26 may comprise a single fiber or multi-fiber connector/receptacle assembly. In the embodiment shown in FIG. 1, a network connector 28 attached to the end of the branch cable 24 is received by a network connection receptacle 30. The branch cable 24 extends to the optical connection terminals 18 through branch cable port 32. The cable port 32 may allow the optical fibers of the branch cable 24 to pass through into the optical connection terminals 18. Alternatively, the cable port 32 may have a fiber optic adapter, for example, a multi-fiber adapter, seated therein and the optical fibers of the branch cable 24 may connect to the fiber optic adapter. In this case, optical fibers disposed in the optical connection terminals 18, may connect with the fiber optic adapter to establish optical connectivity with the optical fibers of the branch cable 24. A drop cable 34 extends from the optical connection terminal 18 to subscriber premises 36. In this manner, branch cable 24 provides optical communication between the distribution cable 14 and the subscriber premises 36 through the optical connection terminals 18.

The branch cable 24 is shown in segments with each segment of the branch cable 24 comprising optical fibers designated by the letter "F" for purposes of discussing the embodiments. A segment of the branch cable 24 is shown extending from the distribution cable 14 at branching point 16 to an optical connection terminal 18, while another segment of the branch cable 24 is shown extending from one of the optical connection terminals 18 to another one of the optical connection terminals 18. The segment of the branch cable 24 extending from the distribution cable 14 comprises optical fibers F1-Fm. The segment of the branch cable 24 that extends from one of the optical connection terminals 18 to another one of the optical connection terminals 18 comprises optical fibers F1-Fn and F1-Fp, respectively. The designation of "m", "n" and "p" indicates the number of optical fibers in that segment of the branch cable 24. In this exemplary embodiment, "m," "n," and "p" may be different, indicting a different number of optical fibers in each of the segments of the branch cable 24. Alternatively, any two or all three of "m," "n" and "p" may be equal, indicating that the number of optical fibers is the same in each segment of branch cable 24. One or more of m, n and p may equal 1.

In FIG. 1, the optical connection terminals 18 each are configured with a port mapping scheme. The port mapping scheme predetermines the routing and optical coupling of the optical fibers in the branch cable 24 to one or more subscriber premises 36 via a drop port 38 in one or both of the optical connection terminals 18. In this embodiment, optical fibers "F1-Fm" of the segment of branch cable 24 enter the first optical connection terminal 18 via branch cable port 32. At least one of the optical fibers F1-Fm, designated as Fd, routes to at least one drop port 38 based on the port mapping scheme. Also, based on the port mapping scheme, Fd, may be any number of optical fibers. As such, Fd may be one optical fiber, in other words an individual optical fiber, or may be more than one optical fiber, in other words multiple optical fibers, as a non-limiting example, a pair of optical fibers, routed to a drop port 38. Additionally or alternatively, at least one of the optical fibers F1-Fm, designated as Fpt routes to the pass-through port 40 also based on the port mapping scheme. The optical fiber designated as Fpt may or may not be and/or include the optical fiber designated as Fd depending on the port mapping scheme. It should be understood that optical connection terminal 18 may have a plurality of drop ports 38 and a plurality of pass-through ports 40. Additionally, Fd may comprise one or a plurality of optical fibers and Fpt may comprise one or a plurality of optical fibers.

A segment of the branch cable 24 comprising optical fibers designated as F1-Fn extends from the first optical connection terminal 18 to the second optical connection terminal 18. The pass-through port 40 is operable for optically coupling the optical fiber Fpt to one of the optical fibers F1-Fn in the segment of the branch cable 24 that extends from the first optical connection terminal 18. The optical fibers F1-Fn of the segment of branch cable 24 enter the second optical connection terminal 18 via the branch cable port 32. Similar to the first optical connection terminal 18, in the second optical connection terminal 18 the optical fiber designated as Fd of optical fibers F1-Fn routes to the drop port 38 based on a port mapping scheme. Also similar to the first optical connection terminal 18, the optical fiber Fpt of the optical fibers F1-Fn routes to the pass-through port 40 based on a port mapping scheme. And the optical fiber Fpt may or may not be or include Fd depending on the port mapping scheme. Whether optical fibers designated as Fd optically couple with the first drop cable 34 via the drop port 38 in the first optical connection terminal 18 and/or optically couple with the second drop cable 34 via the drop port 38 in the second optical connection terminal 18 is predetermined based the desired port mapping scheme.

Although not shown in FIG. 1, a network connector 28 may be used to connect the segment of the branch cable 24 extending from the first optical connection terminal 18 to the pass-through port 40 of the first optical connection terminal 18. In such case, the manner in which optical fiber Fpt connects to the network connector 28 may be in a pre-determined alignment to result in the desired port mapping scheme. Additionally, a multi-fiber connector and or a splice, such as a fusion splice, may be used to connect the segment of the branch cable 24 to an optical connection terminal 18 in, through and/or instead of the branch cable port 32.

The port mapping scheme of the first optical connection terminal 18 may or may not be the same as the port mapping scheme of the second optical connection terminal 18. However, the port mapping scheme of either and/or both the first and second optical connection terminals 18 serves to predetermine the routing and optical coupling of optical fibers Fd and Fpt for both the first and second optical connection terminals 18. In other words, the port mapping scheme predetermines the routing and optical coupling not only of the distribution cable 14 and the drop cable 34 extending from the drop port 38 of the first optical connection terminal 18, but also of the distribution cable 14 and the drop cable 34 extending from the drop port 38 of the second optical connection terminal 18 in branch 20. And, accordingly, the port mapping scheme, predetermines the optical coupling of the distribution cable 14 and the drop cable 34 extending from the drop port 38 of the second optical connection terminal 18, which, in such case, is through the pass-through port 40 of the first optical connection terminal 18. Further, a segment of the branch cable 24 comprising optical fibers designated as "F1-Fp," may extend from the second optical connection terminal 18 to successive optical connection terminal 18 in the branch 20. The successive optical connection terminal 18 may also be configured with a port mapping scheme. In this manner, the port mapping scheme may predetermine the optical coupling between the distribution cable 14 and the drop ports 38 of the optical connection terminals 18 in the branch 20.

Although not shown in FIG. 1, the optical connection terminal 18 may include other optical components including, but not limited to a splitter, splice protector, WDM device, splice holder and tray, routing guide and slack storage. The port mapping scheme may predetermine the configuring of the optical connection terminal with one or more of these other optical components, and/or the routing of optical fibers to and optically coupling of optical fibers with one or more of the components. As an example, an optical fiber from the branch cable 24 may optically couple to a splitter. The optical signal carried by that optical fiber may be split into multiple optical signals by the splitter. Optical fibers carrying the optical signals may optically couple to a drop cable via one or more of the drop connector ports and/or pass-through connector ports. The optical fiber Fd may output from the splitter and route to the drop port 38 in the optical connection terminal 18.

Figure 2:
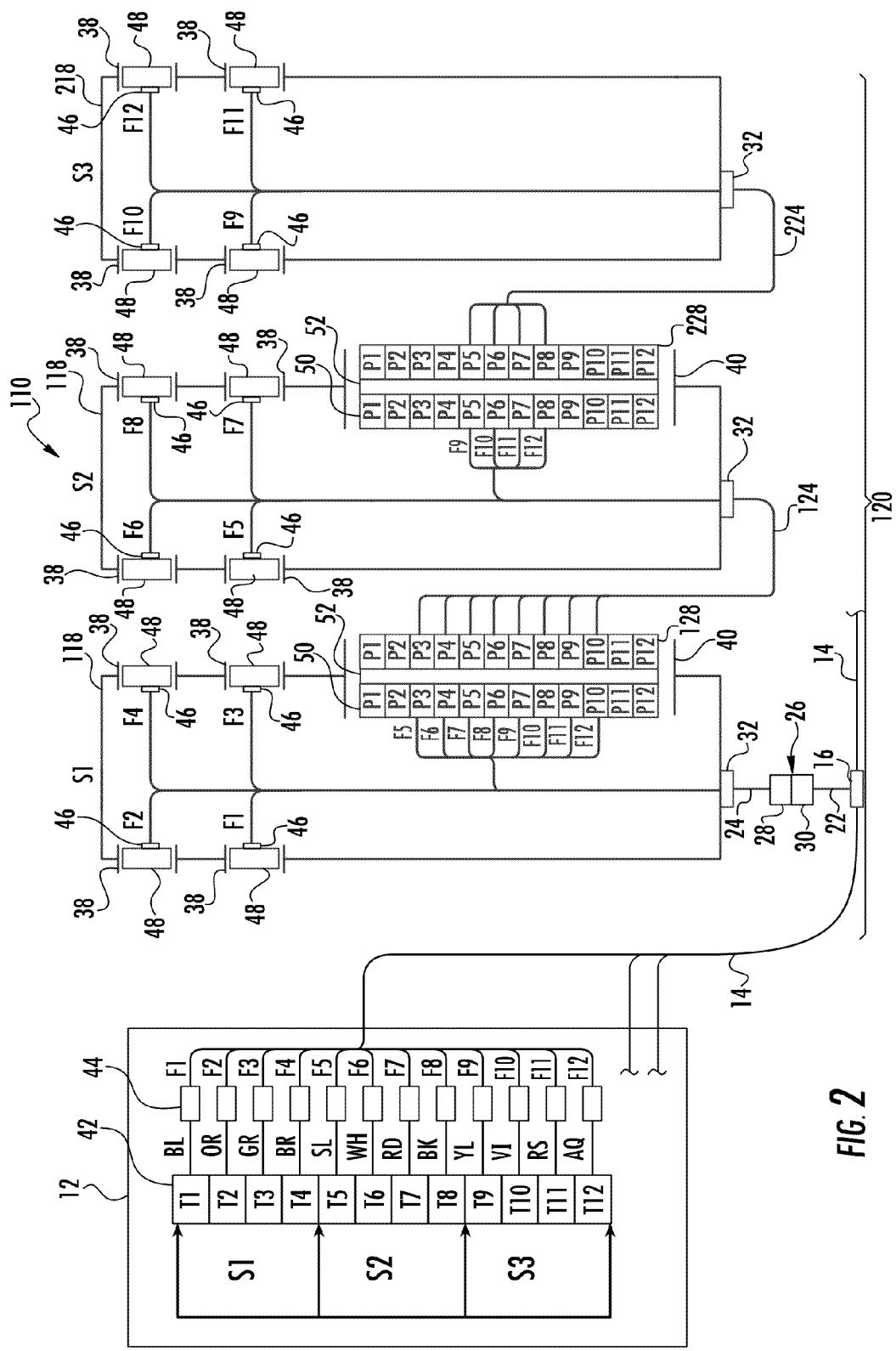
FIG. 2 is a schematic diagram of a portion of a fiber optic network according to an exemplary embodiment, illustrating optical connection terminals in a series connected arrangement.
Figure 3:
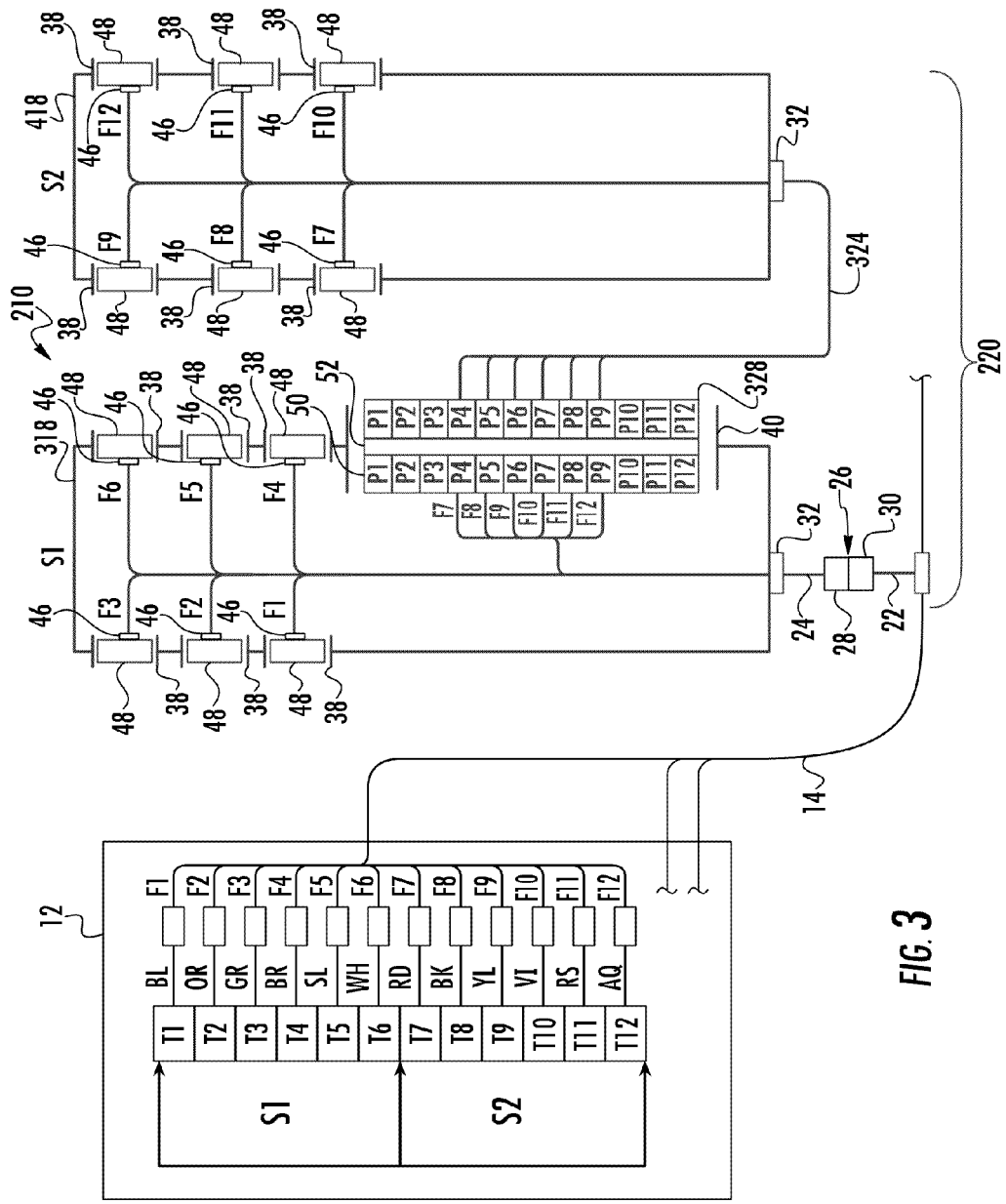
FIG. 3 is a schematic diagram of a portion of a fiber optic network according to an exemplary embodiment, illustrating optical connection terminals in a series connected arrangement.
Figure 4:
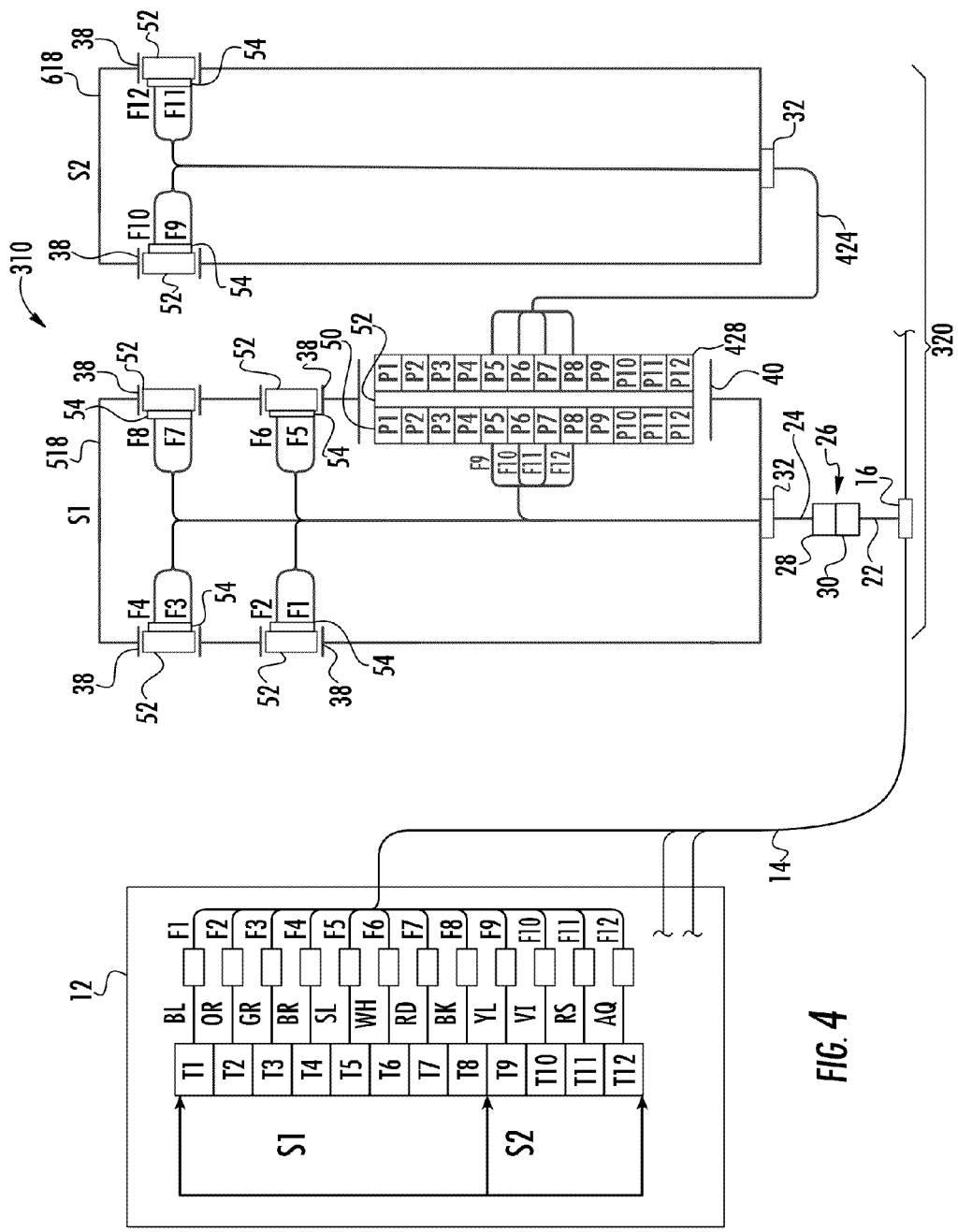
FIG. 4 is a schematic diagram of a portion of a fiber optic network according to an exemplary embodiment, illustrating optical connection terminals in a series connected arrangement.

Turning now to FIGS. 2, 3 and 4, there are shown exemplary embodiments of fiber optic networks having branches from a distribution terminal 12 to series-connected optical connection terminals. FIG. 2 illustrates fiber optic network 110 in which the distribution cable 14 is shown connected to and extending from distribution terminal 12 to branching point 16 in branch 120. The distribution terminal 12 comprises a termination field 42 having any number of termination points. In FIG. 2 twelve termination points T1-T12 are shown. Twelve optical fibers, which may be in the form of pigtails, extend from the termination points to splices 44. Twelve optical fibers F1-F12 from the distribution cable 14 are shown spliced to respective optic fibers extending from termination points T1-T12. The splices are arranged such that the optical fibers F1-F12 are in a color-coded sequence of F1—blue (BL), F2—orange (OR), F3—green (GR), F4—brown (BR), F5—slate (SL), F6—white (WH), F7—(RD), F8—black (BK), F9—yellow (YL), F10—violet (VI), F11—rose (RS), and F12—aqua (AQ). Thus, when the field technician splices and/or terminates the optical fibers in the distribution terminal 12, he or she will understand that an optical fiber color indicates the optical fiber in the F1-F12 sequence. Although individual splices 44 are shown, it should be understood that the splices 44 may be part of a mass fusion splice, in particular in the case that optical fibers F1-F12 are in the form of a ribbonized cable. Additionally, although twelve optical fibers are shown in FIG. 2, it should be understood that the distribution cable 14 may comprise any number of optical fibers. For example, other optical fibers in the distribution cable may splice and terminate to other termination fields in the distribution terminal 12. In this manner, the termination fields may be organized as appropriate for other branches in the fiber optic network.

Tether cable 22 comprising optical fibers F1-F12 split off from the distribution cable 14 at the branching point 16 connects to branch cable 24 via network connection 26 to form branch 120. Branch 120 comprises the optical connection terminals 118 designated as "S1" and "S2" and optical connection terminal 218 designated as "S3." Optical connection terminal 118 (S1 and S2) comprises four drop ports 38 and a pass-though port 40. Optical connection terminal 218 (S3) comprises four drop ports. The optical fibers F1-F12 in branch cable 24 enter optical connection terminal 118 S1 through branch cable port 32. In optical connection terminal 118 S1 four optical fibers F1-F4 each route and connect to a drop port 38 according to a certain port mapping scheme. The optical fibers F1-F4 may have connectorized ends 46. The connectorized ends 46 may received by adapters 48 seated in the drop cable ports 38. Although not shown in FIG. 2, drop cables 34 having connectorized ends may be received by the adapters 48 external to the optical connection terminal 118 and, thereby, an optical connection may be established between the optical fibers F1-F4 and the optical fiber of the respective drop cable 34 extending to subscriber premises. In this manner, at the distribution terminal 12, the field technician based on the certain port mapping scheme may understand that optical fibers F1-F4 provide optical communication to particular subscriber premises connected to optical termination panel section S1. Additionally, the field technician can splice and terminate the optical fibers F1-F4 by just matching the color-coding of the optical fibers extending from termination points T1-T4, i.e. BL, OR, GR and BR. Termination points T-T4 may be identified at the distribution terminal 12 with optical terminal 118 S1 and, therefore, with the particular subscriber premises serviced by the optical terminal 118 S1. This is indicated by the section designated as "S1" in the distribution terminal 12. The section "S1" may be a designated section of the consecutive sequence, with the plurality of optical fibers F1-F4 aligning to that section of the consecutive sequence.

In the optical connection terminal 118 S1, optical fibers F5-F12 route to the pass-through port 40. Optical fibers F5-F12 may be terminated by a multi-fiber connector 50 which is received by a multi-fiber adapter 52 seated in the pass-through port 40. The multi-fiber connector 50 has twelve ports P1-P12 to which optical fibers may connect. Instead of optical fibers F5-F12 connecting to ports P5-P12, optical fibers F5-F12 connect to ports P3-P10, respectively, to centrally align the optical fibers F5-F12 on the multi-fiber connector 50 according to a certain port mapping scheme. The branch cable segment 124 may comprise eight fibers and may be terminated by a network connector 128. The eight optical fibers in the branch cable segment 124 may connect to ports P3-P10 of network connector 128 to centrally align the optical fibers of the branch cable segment 124 in the network connector 128. The network connector 128 may be received by the multi-fiber adapter 52. Because the optical fibers of the branch cable segment 124 are centrally aligned on the network connector 128, being connected to ports P3-P10, the optical fibers of the branch cable segment 124 align with optical fiber F5-F12 when both the multi-fiber connector 50 and the network connector 128 are received by the multi-fiber adapter 52. In this way, an optical connection is established between the optical fibers F5-F12 of the branch cable 124 and the eight optical fibers of the branch cable segment 124 and the consecutive sequence of optical fiber designations and color-coding at the distribution terminal 12 remains consistent.

This consistency may be further illustrated with reference to optical connection terminal 118 S2. Because the optical fibers in the branch cable segment 124 optically connect to optical fibers F5-F12, those optical fiber designation will be used when discussing optical connection terminal 118 S2. The branch cable segment 124 extends from optical connection terminal 118 S1 to optical connection terminal 118 S2 entering optical connection terminal 118 S2 at branch cable port 32. In the optical connection terminal 118 S2, optical fibers F5-F8 each route and connect to a drop port 38, according to a certain port mapping scheme. Similar to optical connection terminal 118 S1, the optical fibers F5-F8 may have connectorized ends 46. The connectorized ends 46 may received by adapters 48 seated in the drop cable ports 38 and, thereby, an optical connection may be established between the optical fibers F5-F8 and the optical fiber of the respective drop cable 34 extending to subscriber premises. In this manner, at the distribution terminal 12, the field technician may understand that optical fibers F5-F8 provide optical communication to particular subscriber premises connected to optical termination panel 118 S2. Additionally, the field technician can splice and terminate the optical fibers F5-F8 by just matching the color-coding of the optical fibers extending from termination points T5-T8, i.e. SL, WH, RD and BK, respectively. Termination points T5-T8 may be identified at the distribution terminal 12 with optical terminal 118 S2 and, therefore, with the particular subscriber premises serviced by the optical terminal 118 S2. This is indicated by the section "S2" in the distribution terminal 12. The section "S2" may be a designated section of the consecutive sequence, with the plurality of optical fibers F5-F8 aligning to that section of the consecutive sequence.

In the optical connection terminal 118 S2, optical fibers F9-F12 route to the pass-through port 40. Optical fibers F9-F12 may be terminated by a multi-fiber connector 50 which is received by a multi-fiber adapter 52 seated in the pass-through port 40. The multi-fiber connector 50 has twelve ports P1-P12 to which optical fibers may connect. Instead of optical fibers F9-F12 connecting to ports P9-P12, optical fibers F5-F12 connect to ports P5-P8, respectively, to centrally align the optical fibers F9-F12 on the multi-fiber connector 50 according to a certain port mapping scheme. The branch cable segment 224 may comprise four fibers and may be terminated by a multi-fiber network connector 228. The four optical fibers in the branch cable segment 224 may connect to ports P5-P8 of network connector 228 to centrally align the optical fibers of the branch cable segment 224 in the network connector 228. The network connector 228 may be received by the multi-fiber adapter 52. Because the optical fibers of the branch cable segment 224 are centrally aligned on the network connector 228, being connected to ports P5-P8, the optical fibers of the branch cable segment 224 align with optical fiber F9-F12 when both the multi-fiber connector 50 and the network connector 228 are received by the multi-fiber adapter 52. In this way, an optical connection is established between the optical fibers F9-F12 and the four optical fibers of the branch cable segment 224 and the consecutive sequence of optical fiber designations and color-coding at the distribution terminal 12 remains consistent.

With continuing reference to FIG. 2, because the optical fibers in the branch cable segment 224 optically connect to optical fibers F9-F12, those optical fiber designation will be used when discussing optical connection terminal 218 S3. The branch cable segment 224 extends from optical connection terminal 118 S2 to optical connection terminal 218 S3 entering optical connection terminal 218 S3 at branch cable port 32. In the optical connection terminal 218 S3, optical fibers F9-F12 each route and connect to a drop port 38 according to a certain port mapping scheme. Similar to optical connection terminals 118 S1 and S2, the optical fibers F9-F12 may have connectorized ends 46. The connectorized ends 46 may received by adapters 48 seated in the drop cable ports 38 and, thereby, an optical connection may be established between the optical fibers F9-F12 and the optical fiber of the respective drop cable 34 extending to subscriber premises. In this manner, at the distribution terminal 12, based on the certain port mapping scheme, the field technician may understand that optical fibers F9-F12 provide optical communication to particular subscriber premises connected to optical termination panel 218 S3. Additionally, the field technician can splice and terminate the optical fibers F9-F12 by just matching the color-coding of the optical fibers extending from termination points T9-T12, i.e. YL, VI, RS and AQ, respectively. Termination points T9-T12 may be identified at the distribution terminal 12 with optical terminal 218 S3 and, therefore, with the particular subscriber premises serviced by the optical connection terminal 218 S3. This is indicated by the section "S3" in the distribution terminal 12. In FIG. 2, optical connection terminal 218 S3 does not have a pass-through port 40 indicating that in this embodiment no additional optical connection terminals are included in branch 120. The section "S3" may be a designated section of the consecutive sequence, with the plurality of optical fibers F9-F12 aligning to that section of the consecutive sequence.

Referring now to FIG. 3, another exemplary embodiment of a series connected fiber optic network 210 is illustrated. In FIG. 3, the distribution terminal 12, distribution cable 14, and tether cable 22 with the connection to the branch cable 24 is consistent with that described with respect to FIG. 2, and, therefore, will not be repeated with respect to FIG. 3. As shown in FIG. 3, branch 220 comprises the optical connection terminal 318 designated as "S1" and the optical connection terminal 418 designated as "S2." Optical connection terminal 318 (S1) comprises six drop ports 38 and a pass-though port 40. Optical connection terminal 418 (S2) comprises six drop ports. The optical fibers F1-F12 in branch cable 24 enter optical connection terminal 318 S1 through branch cable port 32. In optical connection terminal 318 S1 six optical fibers F1-F6 each route and connect to a drop port 38, according to a certain port mapping scheme, and optically connect to respective drop cable 34 extending to subscriber premises in the same manner as discussed with reference to FIG. 2. At the distribution terminal 12, based on the certain port mapping scheme the field technician may understand that optical fibers F1-F6 provide optical communication to particular subscriber premises connected to optical termination panel S1. Additionally, the field technician can splice and terminate the optical fibers F1-F6 by just matching the color-coding of the optical fibers extending from termination points T1-T6, i.e. BL, OR, GR, BR, SL and WH. Termination points T1-T6 may be identified at the distribution terminal 12 with optical terminal S1 and, therefore, with the particular subscriber premises serviced by the optical terminal S1. This is indicated by the section "S1" in the distribution terminal 12. The section "S1" may be a designated section of the consecutive sequence, with the plurality of optical fibers F1-F6 aligning to that section of the consecutive sequence.

In the optical connection terminal 318 S1, optical fibers F7-F12 route to the pass-through port 40. Optical fibers F7-F12 may be terminated by a multi-fiber connector 50 which is received by a multi-fiber adapter 52 seated in the pass-through port 40. The multi-fiber connector 50 has twelve ports P1-P12 to which optical fibers may connect. Instead of optical fibers F7-F12 connecting to ports P7-P12, optical fibers F7-F12 connect to ports P4-P9, respectively, to centrally align the optical fibers F7-F12 on the multi-fiber connector 50 according to a certain port mapping scheme. The branch cable segment 324 may comprise six optical fibers and may be terminated by a network connector 328. The six optical fibers in the branch cable segment 324 may connect to ports P4-P9 of network connector 328 to centrally align the optical fibers of the branch cable segment 324 in the network connector 328. The network connector 328 may be received by the multi-fiber adapter 52. Because the optical fibers of the branch cable segment 324 are centrally aligned on the network connector 328, being connected to ports P4-P9, the optical fibers of the branch cable segment 324 align with optical fiber F7-F12 when both the multi-fiber connector 50 and the network connector 328 are received by the multi-fiber adapter 52. In this way, an optical connection is established between the optical fibers F7-F12 of the branch cable 324 and the six optical fibers of the branch cable segment 324 and the consecutive sequence of optical fiber designations and color-coding at the distribution terminal 12 remains consistent.

With continuing reference to FIG. 3, because the optical fibers in the branch cable segment 324 optically connect to optical fibers F7-F12, those optical fiber designation will be used when discussing optical connection terminal 418 S2. The branch cable segment 324 extends from optical connection terminal 318 S1 to optical connection terminal 418 S2 entering optical connection terminal 418 S2 at branch cable port 32. In the optical connection terminal 418 S2, optical fibers F7-F12 each route and connect to a drop port 38. Similar to optical connection terminals 218 S1, the optical fibers F7-F12 route to the drop cable ports 38 according to a certain port mapping scheme and, thereby, an optical connection may be established between the optical fibers F7-F12 and the optical fiber of the respective drop cable 34 extending to subscriber premises. In this manner, at the distribution terminal 12, based on the certain port mapping scheme, the field technician may understand that optical fibers F7-F12 provide optical communication to particular subscriber premises connected to optical termination panel 418 S2. Additionally, the field technician can splice and terminate the optical fibers F7-F12 by just matching the color-coding of the optical fibers extending from termination points T7-T12, i.e., RD, BK, YL, VI, RS and AQ, respectively. Termination points T7-T12 may be identified at the distribution terminal 12 with optical terminal 418 S2 and, therefore, with the particular subscriber premises serviced by the optical connection terminal 418 S2. This is indicated by the section "S2" in the distribution terminal 12. The section "S2" may be a designated section of the consecutive sequence, with the plurality of optical fibers F7-F12 aligning to that section of the consecutive sequence. In FIG. 3, optical connection terminal 418 S2 does not have a pass-through port 40 indicating that in this embodiment no additional optical connection terminals are included in branch 220.

Referring now to FIG. 4, another exemplary embodiment of a series connected fiber optic network 310 is illustrated. In FIG. 3, the distribution terminal 12, distribution cable 14, and tether cable 22 with the connection to the branch cable 24 is consistent with that described with respect to FIG. 2, and, therefore, will not be repeated with respect to FIG. 4. As shown in FIG. 4, branch 320 comprises the optical connection terminal 518 designated as "S1" and the optical connection terminal 618 designated as "S2." Optical connection terminal 518 (S1) comprises four drop ports 38 and a pass-though port 40. Optical connection terminal 618 (S2) comprises two drop ports 38. The optical fibers F1-F12 in branch cable 24 enter optical connection terminal 518 S1 through branch cable port 32. In optical connection terminal 518 S1 eight optical fibers F1-F8 route and connect in pairs, i.e., two optical fibers, to a drop port 38 according to a certain port mapping scheme. In this embodiment, the optical fiber pairs are F1 and F2, F3 and F4, F5 and F6, F7 and F8, with each pair terminated by a multi-fiber connector, which in the embodiment shown in FIG. 4, is two-fiber connector 54, received by a multi-fiber adapter 52. Each optical fiber pair optically connect to optical fibers in a respective drop cable 34 extending to subscriber premises. At the distribution terminal 12, based on the certain port mapping scheme, the field technician may understand that optical fibers F1-F8 provide optical communication to particular subscriber premises connected to optical termination panel S1. Additionally, the field technician can splice and terminate the optical fibers F1-F8 by just matching the color-coding of the optical fibers extending from termination points T1-T8, i.e. BL, OR, GR, BR, SL, WH, RD and BK. Termination points T1-T8 may be identified at the distribution terminal 12 with optical terminal S1 and, therefore, with the particular subscriber premises serviced by the optical terminal S1. This is indicated by the section "S1" in the distribution terminal 12. The section "S1" may be a designated section of the consecutive sequence, with the plurality of optical fibers F1-F8 aligning to that section of the consecutive sequence. This embodiment may be appropriate when the subscriber premises 36 is a commercial enterprise requiring a higher bandwidth service, thereby requiring two fiber optic cables extended to the subscriber premises 36.

In the optical connection terminal 518 S1, optical fibers F9-F12 route to the pass-through port 40. Optical fibers F9-F12 may be terminated by a multi-fiber connector 50 which is received by a multi-fiber adapter 52 seated in the pass-through port 40. The multi-fiber connector 50 has twelve ports P1-P12 to which optical fibers may connect. Instead of optical fibers F9-F12 connecting to ports P9-P12, optical fibers F9-F12 connect to ports P5-P8, respectively, to centrally align the optical fibers F9-F12 on the multi-fiber connector 50 according to a certain port mapping scheme. The branch cable segment 424 may comprise four optical fibers and may be terminated by a network connector 428. The four optical fibers in the branch cable segment 424 may connect to ports P5-P8 of network connector 428 to centrally align the optical fibers of the branch cable segment 424 in the network connector 428. The network connector 428 may be received by the multi-fiber adapter 52. Because the optical fibers of the branch cable segment 424 are centrally aligned on the network connector 428, being connected to ports P5-P8, the optical fibers of the branch cable segment 424 align with optical fiber F9-F12 when both the multi-fiber connector 50 and the network connector 428 are received by the multi-fiber adapter 52. In this way, an optical connection is established between the optical fibers F9-F12 of the branch cable 424 and the four optical fibers of the branch cable segment 424, and the consecutive sequence of optical fiber designations and color-coding at the distribution terminal 12 remains consistent.

With continuing reference to FIG. 4, because the optical fibers in the branch cable segment 424 optically connect to optical fibers F9-F12, those optical fiber designation will be used when discussing optical connection terminal 618 S2. The branch cable segment 424 extends from optical connection terminal 518 S1 to optical connection terminal 618 S2 entering optical connection terminal 618 S2 at branch cable port 32. In the optical connection terminal 618 S2, optical fibers F9-F12 route and connect in pairs i.e., two optical fibers, to a drop port 38, according to a certain port mapping scheme. In this embodiment, the optical fiber pairs are F9 and F10, F11 and F12, with each pair terminated by a multi-fiber connector, which is shown as a two-fiber connector 54, received by a multi-fiber adapter 52. Each optical fiber pair optically connect to optical fibers in a respective drop cable 34 extending to subscriber premises. In this manner, at the distribution terminal 12, based on the certain port mapping scheme, the field technician may understand that optical fibers F9-F12 provide optical communication to particular subscriber premises connected to optical termination panel 618 S2. Additionally, the field technician can splice and terminate the optical fibers F9-F12 by just matching the color-coding of the optical fibers extending from termination points T9-T12, i.e., YL, VI, RS and AQ, respectively. Termination points T9-T12 may be identified at the distribution terminal 12 with optical terminal 618 S2 and, therefore, with the particular subscriber premises serviced by the optical connection terminal 618 S2. This is indicated by the section "S2" in the distribution terminal 12. The section "S2" may be a designated section of the consecutive sequence, with the plurality of optical fibers F9-F12 aligning to that section of the consecutive sequence. In FIG. 4, optical connection terminal 618 S2 does not have a pass-through port 40 indicating that in this embodiment no additional optical connection terminals are included in branch 320.

Figure 5:
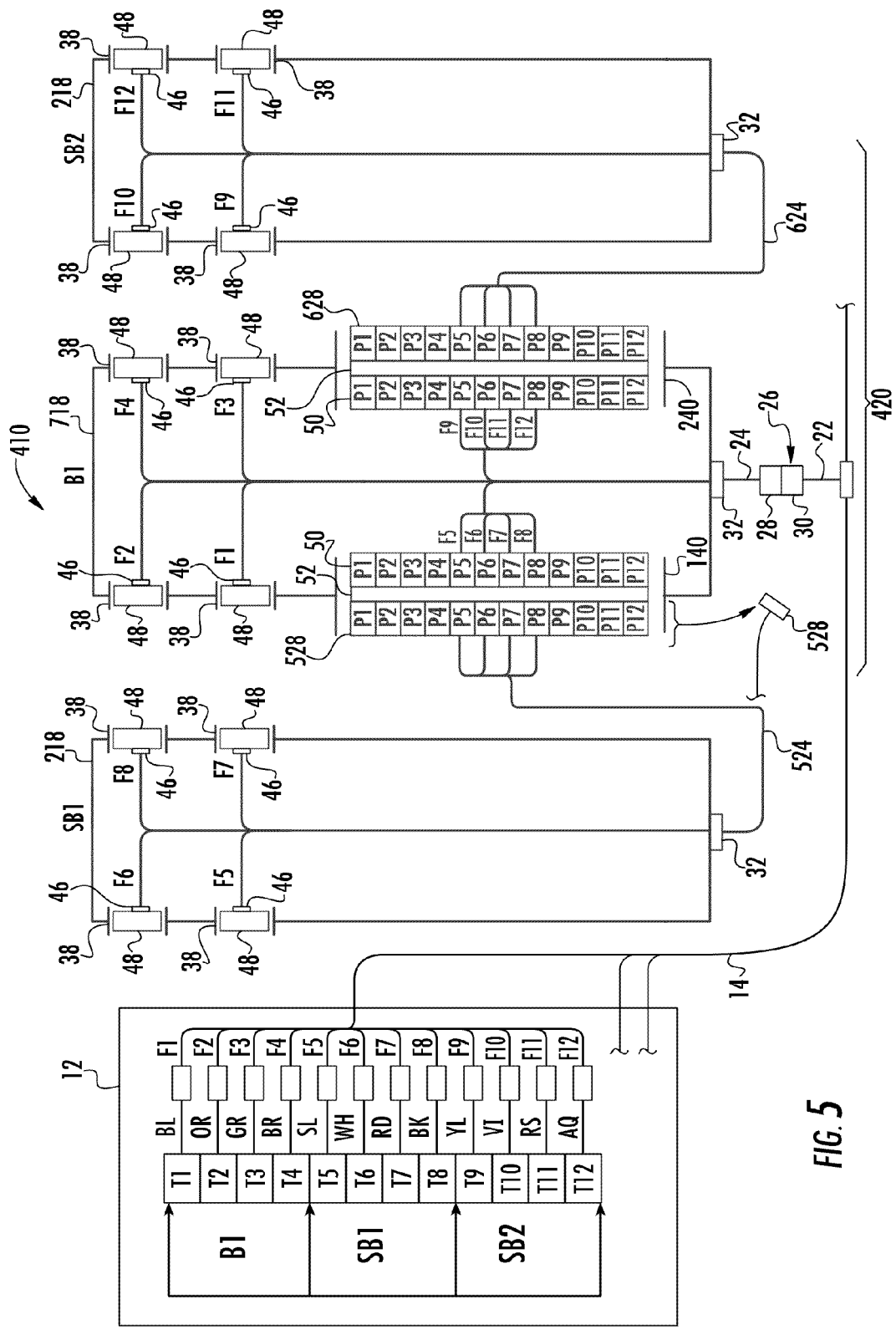
FIG. 5 is a schematic diagram of a portion of a fiber optic network according to an exemplary embodiment, illustrating optical connection terminals in a branch and sub-branch arrangement.
Figure 6:
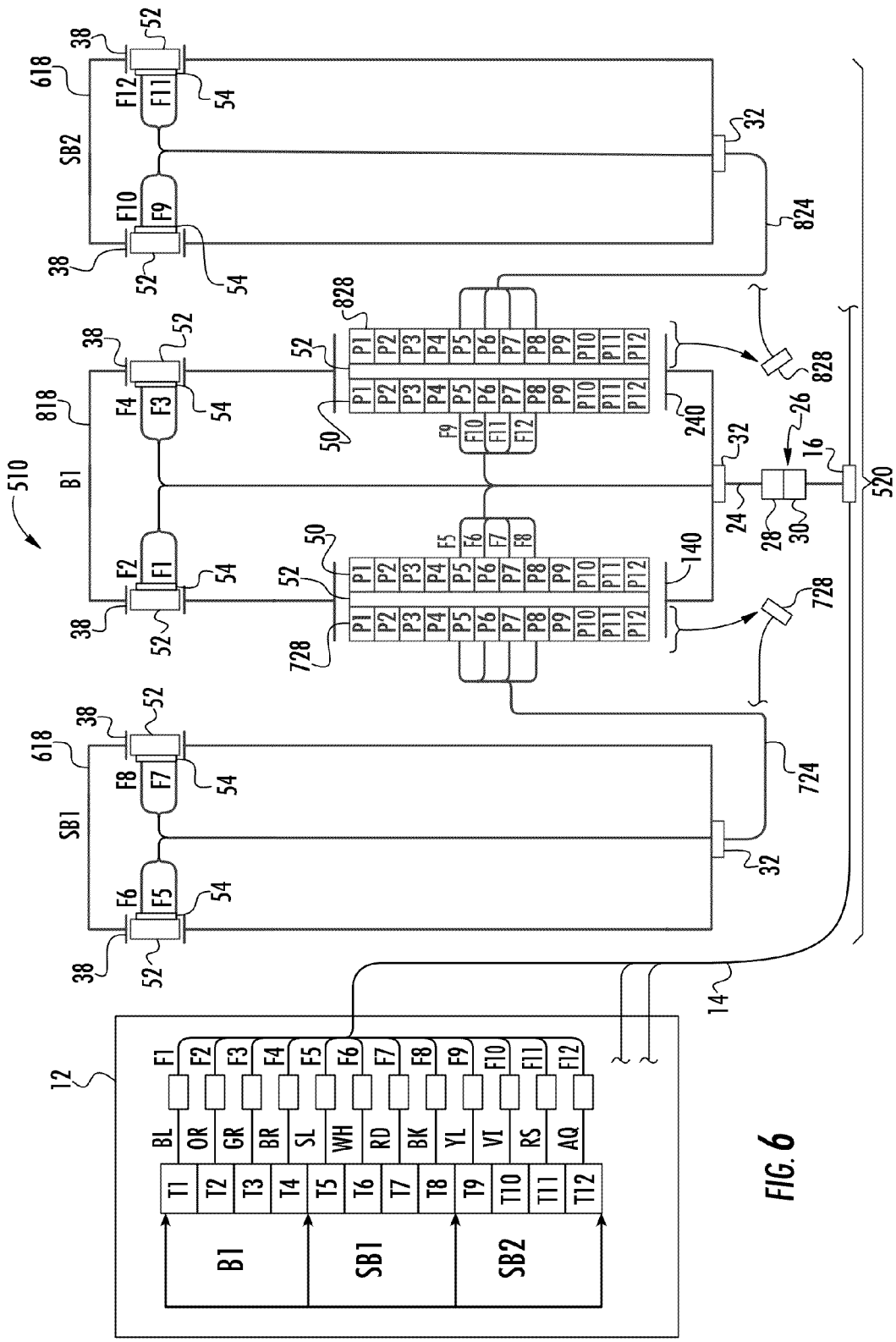
FIG. 6 is a schematic diagram of a portion of a fiber optic network according to an exemplary embodiment, illustrating optical connection terminals in a branch and sub-branch arrangement.

Turning now to FIGS. 5 and 6, there are shown exemplary embodiments of fiber optic networks having branches from a distribution terminal 12 to a branching optical connection terminal to form sub-branches off of the branch FIG. 5 illustrates fiber optic network 410 comprising a branch 420. In FIG. 5, the distribution terminal 12, distribution cable 14, and tether cable 22 with the connection to the branch cable 24 are consistent with that described with respect to FIG. 2, and, therefore, will not be repeated with respect to FIG. 5. As shown in FIG. 5, branch 420 comprises the optical connection terminal 718 designated as "B1" and two optical connection terminals 218 designated as "SB1" and "SB2." Optical connection terminal 718 (B1) comprises four drop ports 38 and two pass-though ports 140, 240. In this manner, the two pass-through ports 140, 240 of the optical connection terminal 718 B1 may be used to establish sub-branches of branch 420, according to a certain port mapping scheme. Optical connection terminal 218 (SB1 and SB2) comprise four drop ports 38 and are consistent with the optical connection terminal 218 in FIG. 2.

The optical fibers F1-F12 in branch cable 24 enter optical connection terminal 718 B1 through branch cable port 32. In optical connection terminal 718 B1, four optical fibers F1-F4 each route and connect to a drop port 38 according to a certain port mapping scheme and optically connect to respective drop cable 34 extending to subscriber premises in the same manner as discussed with reference to FIG. 2. At the distribution terminal 12, based on the certain port mapping scheme, the field technician may understand that optical fibers F1-F4 provide optical communication to particular subscriber premises connected to optical termination panel B1. Additionally, the field technician can splice and terminate the optical fibers F1-F4 by just matching the color-coding of the optical fibers extending from termination points T1-T4, i.e. BL, OR, GR and BR. Termination points T1-T4 may be identified at the distribution terminal 12 with optical connection terminal B1 and, therefore, with the particular subscriber premises serviced by the optical connection terminal B1. This is indicated by the section "B1" in the distribution terminal 12. The section "B1" may be a designated section of the consecutive sequence, with the plurality of optical fibers F1-F4 aligning to that section of the consecutive sequence.

In the optical connection terminal 718 B1, optical fibers F5-F8 route to first pass-through port 140 and optical fibers F9-F12 route to second pass-through port 240. Optical fibers F5-F8 may be terminated by a multi-fiber connector 50 which is received by a multi-fiber adapter 52 seated in the first pass-through port 140. The multi-fiber connector 50 has twelve ports P1-P12 to which optical fibers may connect. The optical fibers F5-F8 connect to ports P5-P8, respectively, to centrally align the optical fibers F5-F8 on the multi-fiber connector 50 according to a certain port mapping scheme. Optical fibers F9-F12 may be terminated by a multi-fiber connector 50 which is received by a multi-fiber adapter 52 seated in the first pass-through port 240. The multi-fiber connector 50 has twelve ports P1-P12 to which optical fibers may connect. Instead of the optical fibers F9-F12 connecting to ports P9-P12, optical fibers F9-F12 connect to ports P5-P8, respectively, to centrally align the optical fibers F9-F12 on the multi-fiber connector 50.

First sub-branch cable 524 extends from optical connection terminal 718 B1 to optical connection terminal 218 SB1. The first sub-branch cable 524 may comprise four optical fibers and may be terminated by a network connector 528. The four optical fibers in the first sub-branch cable 524 may connect to ports P5-P8 of the network connector 528 to centrally align the optical fibers of the first sub-branch cable 524 in the network connector 528 according to a certain port mapping scheme. The network connector 528 may be received by the multi-fiber adapter 52 seated in the first pass-through port 140. Because the optical fibers of the first sub-branch cable 524 are centrally aligned on the network connector 528, being connected to ports P5-P8, the optical fibers of the first sub-branch cable 524 align with optical fiber F5-F8 when both the multi-fiber connector 50 and the network connector 528 are received by the multi-fiber adapter 52 seated in the first pass-through port 140. In this way, an optical connection is established between the optical fibers F5-F8 of the branch cable 24 and the four optical fibers of the first sub-branch cable 524, and the consecutive sequence of optical fiber designations and color-coding at the distribution terminal 12 remains consistent.

Second sub-branch cable 624 extends from optical connection terminal 718 B1 to optical connection terminal 218 SB2. The second sub-branch cable 624 may comprise four optical fibers and may be terminated by a network connector 628. The four optical fibers in the second sub-branch cable 624 may connect to ports P5-P8 of the network connector 628 to centrally align the optical fibers of the second sub-branch cable 624 in the network connector 628 according to a certain port mapping scheme. The network connector 628 may be received by the multi-fiber adapter 52 seated in the second pass-through port 240. Because the optical fibers of the second sub-branch cable 624 are centrally aligned on the network connector 628, being connected to ports P5-P8, the optical fibers of the second sub-branch cable 624 align with optical fiber F9-F12 when both the multi-fiber connector 50 and the network connector 628 are received by the multi-fiber adapter 52 seated in the second pass-through port 240. In this way, an optical connection is established between the optical fibers F9-F12 of the branch cable 24 and the four optical fibers of the second sub-branch cable 624, and the consecutive sequence of optical fiber designations and color-coding at the distribution terminal 12 remains consistent.

With continuing reference to FIG. 5, because the optical fibers in the sub-branch cable 524 optically connect to optical fibers F5-F8, those optical fiber designation will be used when discussing optical connection terminal 218 SB1. The sub-branch cable 524 extends from optical connection terminal 718 B1 to optical connection terminal 218 SB1 entering optical connection terminal 218 SB1 at branch cable port 32. In the optical connection terminal 218 SB1, optical fibers F5-F8 each route and connect to a drop port 38 according to a certain port mapping scheme. The optical fibers F5-F8 route to the drop cable ports 38 and, thereby, an optical connection may be established between the optical fibers F5-F8 and the optical fiber of the respective drop cable 34 extending to subscriber premises. In this manner, at the distribution terminal 12, based on the certain port mapping scheme, the field technician may understand that optical fibers F5-F8 provide optical communication to particular subscriber premises connected to optical termination panel 218 SB1. Additionally, the field technician can splice and terminate the optical fibers F5-F8 by just matching the color-coding of the optical fibers extending from termination points T5-T8, i.e., SL, WH, RD and BK, respectively. Termination points T5-T8 may be identified at the distribution terminal 12 with optical terminal 218 SB1 and, therefore, with the particular subscriber premises serviced by the optical connection terminal 218 SB1. This is indicated by the section "SB1" in the distribution terminal 12. The section "SB1" may be a designated section of the consecutive sequence, with the plurality of optical fibers F5-F8 aligning to that section of the consecutive sequence. In FIG. 5, optical connection terminal 218 SB1 does not have a pass-through port 40 indicating that in this embodiment no additional optical connection terminals are included in the sub-branch of branch 420.

Additionally, because the optical fibers in the second sub-branch cable 624 optically connect to optical fibers F9-F12, those optical fiber designation will be used when discussing optical connection terminal 218 SB2. The sub-branch cable 624 extends from optical connection terminal 718 B1 to optical connection terminal 218 SB2 entering optical connection terminal 218 SB2 at branch cable port 32. In the optical connection terminal 218 SB2, optical fibers F9-F12 each route and connect to a drop port 38. The optical fibers F9-F12 route to the drop cable ports 38, according to a certain port mapping scheme, and, thereby, an optical connection may be established between the optical fibers F9-F12 and the optical fiber of the respective drop cable 34 extending to subscriber premises. In this manner, at the distribution terminal 12, based on the certain port mapping scheme, the field technician may understand that optical fibers F9-F12 provide optical communication to particular subscriber premises connected to optical termination panel 218 SB2. Additionally, the field technician can splice and terminate the optical fibers F9-F12 by just matching the color-coding of the optical fibers extending from termination points T9-T12, i.e., YL, VI, RS and AQ, respectively. Termination points T9-T12 may be identified at the distribution terminal 12 with optical terminal 218 SB2 and, therefore, with the particular subscriber premises serviced by the optical connection terminal 218 SB2. This is indicated by the section "SB2" in the distribution terminal 12. The section "SB2" may be a designated section of the consecutive sequence, with the plurality of optical fibers F9-F12 aligning to that section of the consecutive sequence. In FIG. 5, optical connection terminal 218 SB2 does not have a pass-through port 40 indicating that in this embodiment no additional optical connection terminals are included in the sub-branch of branch 420.

Because the port mapping scheme in these embodiments, a consistency with the sequencing of the optical fibers results at the distribution terminal 12, the optical connection terminal SB1 may be connected in the fiber optic network 410 prior to the optical connection terminal 718 B1. In other words, due to commercial and build out reasons it may be preferred to install an optical connection terminal with the structure of optical connection terminal 218 prior to installing an optical connection terminal with the structure of optical connection terminal 718. In such case, the optical connection terminal 218 is installed such that the sub-branch cable 524 becomes the branch cable 24 and the network connector 528 connects with network connection receptacle 30.

In this regard, at the distribution terminal 12, although optical connection terminal 718 B1 has not been installed yet, the field technician still splices and terminates the optical fibers F5-F8 by matching the color-coding of the optical fibers extending from termination points T5-T8, i.e., SL, WH, RD and BK, respectively. As such, termination points T5-T8 are still identified at the distribution terminal 12 with optical terminal 218 SB1 and, therefore, with the particular subscriber premises serviced by the optical connection terminal 218 SB1. This is indicated by the section "SB1" in the distribution terminal 12. In FIG. 5, optical connection terminal 218 SB1 does not have a pass-through port 40 indicating that in this embodiment no additional optical connection terminals are included in the sub-branch of branch 420.

When the optical connection terminal 718 B1 is to be installed, the network connector 528 may be disconnected from the network connection receptacle 30. The network connector 28 on branch cable 24 may then be connected to the network connection receptacle 30. As discussed above, the field technician splices and terminates the optical fibers F1-F4 by matching the color-coding of the optical fibers extending from termination points T1-T4, i.e. BL, OR, GR and BR. Termination points T1-T4 may be identified at the distribution terminal 12 with optical connection terminal B1 and, therefore, with the particular subscriber premises serviced by the optical connection terminal B1. This is indicated by the section "B1" in the distribution terminal 12. However, the field technician can splice and connect the optical fibers optically connected to optical connection terminal B1, without having to disconnect and/or reconnect the optical fibers optically connected to optical connection terminal SB1. In other words, optical connection terminal SB1 may remain active or "hot" while optical connection terminal B1 is being installed and connected. This embodiment, provides for a "hot swappable" optical connection terminal connection at the distribution terminal 12.

Referring now to FIG. 6, an embodiment illustrating fiber optic network 510 with branch 520 is presented. Branch 520 includes an optical connection terminal 818 designated as "B1" and two optical connection terminals 618 designated as "SB1" and "SB2." Optical connection terminal 818 (B1) comprises two drop ports 38 and two pass-though ports 140, 142. Optical connection terminal 618 (SB1 and SB2) comprise two drop ports 38. The embodiment in FIG. 6 is similar to the embodiment illustrated in FIG. 5, with the exception that branch 520 comprises the optical connection terminals that have optical fibers which route and connect in pairs, i.e., two optical fibers, to a drop port 38 according to a certain port mapping scheme. Therefore, a pair of optical fibers terminate with a multi-fiber connector, shown in FIG. 6 as a two-fiber connector 54 which is received by a multi-fiber adapter 52 seated in the drop port 38 as more described above with reference to FIG. 4. Additionally, in FIG. 6, the first sub-branch cable 724 connects with optical connection terminal 818 B1 via network connector 728 through first pass-through port 140 in the same manner as the first sub-branch cable 524 connects with optical connection terminal 718 B1 via network connector 528 discussed with reference to FIG. 5. Also, the second sub-branch cable 824 connects with optical connection terminal 818 B1 via network connector 828 through the second pass-through port 240 in the same manner as the second sub-branch cable 624 connects with optical connection terminal 718 B1 via network connector 628 discussed with reference to FIG. 5. Therefore, such features will not be discussed again with reference to FIG. 6.

FIG. 6 is included to illustrate another embodiment that provides the "hot swappable" feature as discussed with reference to FIG. 5. In this embodiment, the optical connection terminal 618 is installed first such that the sub-branch cable 724 becomes the branch cable 24 and the network connector 528 connects with network connection receptacle 30. In this regard, at the distribution terminal 12, based on the certain port mapping scheme, and although optical connection terminal 818 B1 has not been installed yet, the field technician still splices and terminates the optical fibers F5-F8 by matching the color-coding of the optical fibers extending from termination points T5-T8, i.e., SL, WH, RD and BK, respectively. As such, termination points T5-T8 are still identified at the distribution terminal 12 with optical terminal 618 SB1 and, therefore, with the particular subscriber premises serviced by the optical connection terminal 618 SB1. This is indicated by the section "SB1" in the distribution terminal 12. The section "SB1" may be a designated section of the consecutive sequence, with the plurality of optical fibers F5-F8 aligning to that section of the consecutive sequence. In FIG. 6, optical connection terminal 618 SB1 does not have a pass-through port 40 indicating that in this embodiment no additional optical connection terminals are included in the sub-branch of branch 520.

When the optical connection terminal 818 B1 is to be installed, the network connector 728 may be disconnected from the network connection receptacle 30. The network connector 28 on branch cable 24 may then be connected to the network connection receptacle 30. As discussed above, the field technician splices and terminates the optical fibers F1-F4 by matching the color-coding of the optical fibers extending from termination points T1-T4, i.e. BL, OR, GR and BR. Termination points T1-T4 may be identified at the distribution terminal 12 with optical connection terminal B1 and, therefore, with the particular subscriber premises serviced by the optical connection terminal B1. This is indicated by the section "B1" in the distribution terminal 12. The section "B1" may be a designated section of the consecutive sequence, with the plurality of optical fibers F1-F4 aligning to that section of the consecutive sequence. The field technician can splice and connect the optical fibers optically connected to optical connection terminal B1, without having to disconnect and/or reconnect the optical fibers optically connected to optical connection terminal SB1. In other words, optical connection terminal SB1 may remain active or "hot" while optical connection terminal B1 is being installed and connected.

Figure 7:
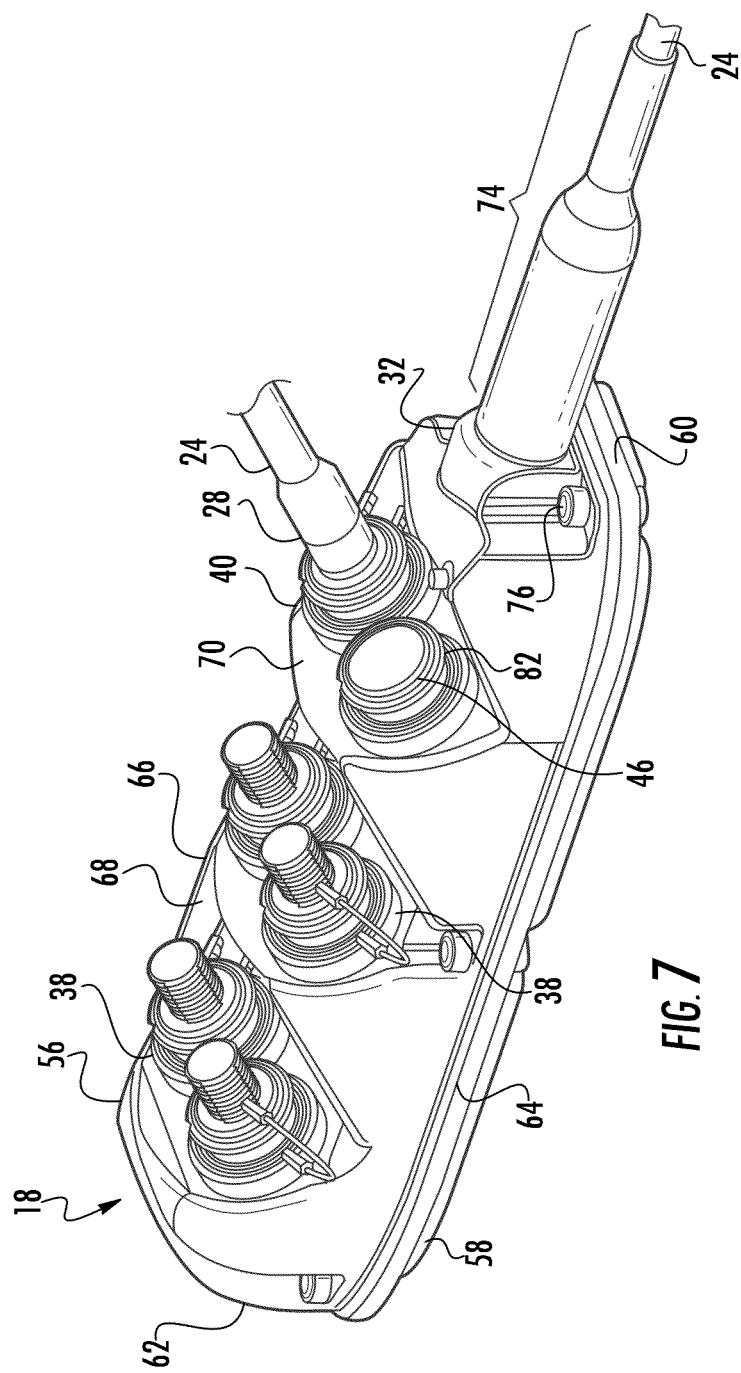
FIG. 7 is a perspective view of a structure of a optical connection terminal having four ports, according to an exemplary embodiment.
Figure 8:
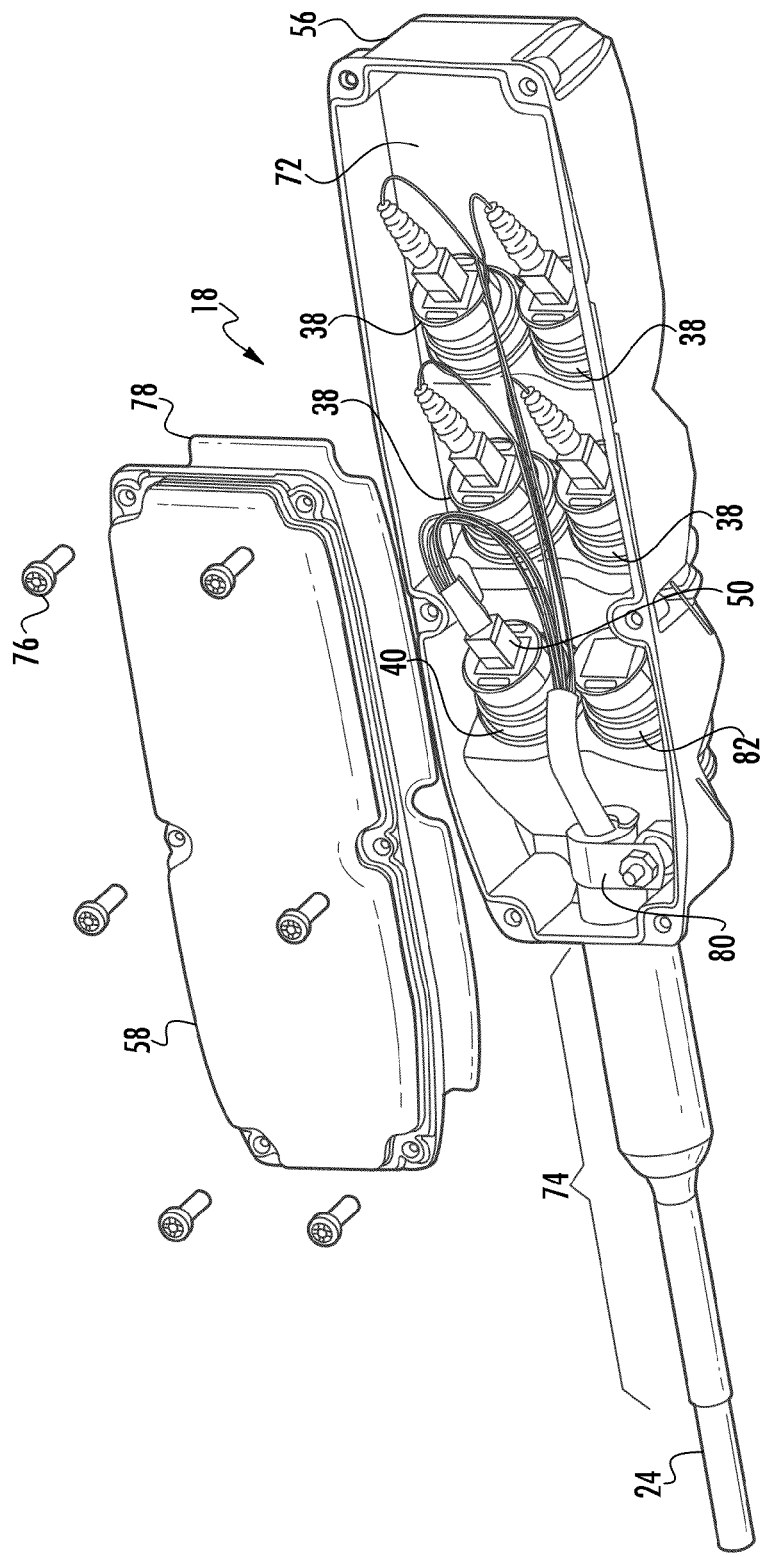
FIG. 8 is an internal perspective view of the structure of the optical connection terminal of FIG. 7, illustrating the predetermined routing of optical fibers based on a port mapping scheme, according to an exemplary embodiment.

Turning now to FIGS. 7 and 8, an exemplary embodiment of a multi-port device as an optical connection terminal 18 in accordance with the present invention is shown. As shown in FIG. 7, the optical connection terminal 18 comprises a base 56 and a cover 58 each made of a lightweight, yet rigid material, such as plastic, thermoplastic, composite or aluminum material. The base 56 and the cover 58 define an enclosure having an exterior surface. Additionally, the base 56 has opposed end walls 60, 62 and sidewalls 64, 66, of the exterior surface. The base 56 is further provided with an upper surface 68 of the exterior surface. The upper surface 68 of the base 56 is provided with a plurality of angled or sloped surfaces 70. Each angled surface 70 has at least one drop connector port 38 formed therethrough. Further, the base 56 is generally box-shaped and defines an interior cavity 72 for housing fiber optic hardware, such as connector ports, adapters, optical fiber routing guides, fiber hubs and the like. The base 56 may have any of a variety of shapes that is suitable for housing fiber optic hardware and for routing and connecting optical fibers of the branch cable 24, as described herein. However, by way of example only, the base 56 of this embodiment is generally rectangular and is elongated in the lengthwise direction relative to the widthwise direction between the opposed end walls 60, 62.

A branch cable port 32 is disposed through the exterior surface. Although the branch cable port 32 may be at any position through the exterior surface, in the embodiment shown, the branch cable port 32 is disposed in the end wall 60 of the base 56. The branch cable port 32 is operable for receiving a branch cable assembly 74 comprising the branch cable 24. The branch cable assembly 74 is inserted through the branch cable port 32 of the optical connection terminal 18. The end of the branch cable 24 having at least one pre-connectorized optical fiber mounted thereon is routed through the branch cable port 32 into the interior cavity 72. The branch cable assembly 74 is any type of assembly or structure that provides for the entrance of the branch cable 24 into the optical connection terminal 18, and the sealing of the branch cable 24 as it enters the optical connection terminal 18. Additionally, the branch cable assembly 74 may provide strain relief to the branch cable 24 as is known in the art. Alternatively, a multi-fiber connector (not shown) may be used to connect the branch cable 24 to the optical connection terminal 18. In such case, instead of the branch cable assembly 74 as depicted in FIGS. 7 and 8, the multi-fiber connector may be connected to an adapter seated within the branch cable port 32. Another multi-fiber connector (not shown) may be used to connect to the adapter in the interior cavity 72, thereby optically connect the optical fibers of the branch cable 24 to optical fibers disposed within the optical connection terminal 18.

The cover 58 is adapted to be attached to the base 56 such that the optical connection terminal 18 is re-enterable to provide ready access to the interior cavity 72, particularly in the field, if necessary to reconfigure the optical fibers of the branch cable 24 relative to the drop ports 38 and the pass-through port 40. Specifically, the base 56 and cover 58 are preferably provided with a fastening mechanism 76 such as, but not limited to, clasps, fasteners, threaded bolts or screws and inserts, or other conventional means for securing the cover 58 to the base 56 in the closed configuration. However, the cover 58 may be slidably attached to the base 56 to selectively expose portions of the interior cavity 72 of the base 56. Alternatively, the cover 58 may be hingedly attached to the base 56 at one or more hinge locations (not shown) to allow the cover 58 and base 56 to remain secured to one another in the opened configuration. A gasket 78 may be disposed between a peripheral flange provided on the base 56 and the interior of the cover 58. As shown, the gasket 78 is generally rectangular and of a size corresponding to that of the base 56 and the cover 58. Alternatively, in certain locations the service provider may determine that it is not desirable that optical connection terminal 18 be enterable in the field, and, therefore, may decide to fasten the base 56 to the cover 58 by welding, for example using an epoxy type of weld.

As illustrated in FIG. 8, the branch cable 24 passes through the branch cable port 32 and enters the optical connection terminal 18. A securing mechanism 80, such as for example, a fastener, clamp and nut, bracket or clasp, is provided in the interior cavity 72 of the optical connection terminal 18 to secure the branch cable 24 to the base 56. Alternatively, instead of the branch cable 24 passing through the branch cable port 32, the branch cable 24 may have a connector on the end, which, in such case, would connect with an adapter seated in the branch cable port 24. Also, alternatively, the optical fibers in the branch cable 24 may be splice, for example, fusion spliced, with optical fibers in the interior cavity. In this embodiment, the branch cable 24 is a twelve fiber optical cable. It should be understood that the disclosure is not limited to a branch cable 24 having any specific number of optical fibers. A branch cable 24 having less or more than twelve optical fibers may be used. Within the optical connection terminal 18, at least one individual optical fiber of the branch cable 24 in the form of a pigtail terminates at its respective connector. The pre-connectorized optical fiber or pigtail is routed within the interior cavity 72 of the optical connection terminal 18 and connects to an adapter 48 (not shown) seated within the respective drop port 38. The optical fiber or pigtail may be pre-connectorized with any suitable connector, for example, an SC connector, for single fibers, and a MTP, for multiple fibers, available from Corning Cable Systems LLC of Hickory, N.C. In FIG. 8 four pre-connectorized optical fibers are shown each connecting to the respective drop port 38. A field-connectorized or pre-connectorized drop cable 34 may be connected to the adapter 48 seated within the drop port 38 from the exterior of the optical connection terminal 18. The drop cable 34 may be connectorized or pre-connectorized with any suitable ruggedized connector, for example, an OptiTap® connector, for single fiber, or OptiTip® connector, for multiple fibers, available from Corning Cable Systems LLC of Hickory, N.C.

Additionally, optical fibers of the branch cable 24 may be connected to a pass-through connector 50 (not shown). The pass-through connector 50 may be any type of multi-fiber connector, such as an MTP connector available from Corning Cable Systems LLC of Hickory, N.C. Alternatively, a splice, such as a fusion splice may be used instead of a pass-through connector 50. In this embodiment, eight optical fibers of the branch cable 24 connected to a twelve port pass-through connector 50. The pass-through connector 50 connects to a multi-fiber adapter 52 seated in the pass-through connector port 40. A segment of the branch cable 24 that extends to another optical connection terminal connects to the multi-fiber adapter 52 through a network connector 28 external to optical connection terminal 18. As described above, the network connector 28 may be any type of multi-fiber connector, such as an OptiTip fiber optic connector. Thus, the multi-fiber adapter 52 may be a MTP/OptiTip adapter to accept and connect the pass-through connector 50, a MTP connector, and the network connector 28, an OptiTip connector. In this manner, the optical connection terminal 18 may be series and/or sub-branch connected with another optical connection terminal 18. A spare port 82, is shown in FIG. 7 with a cap 46 attached thereon. The spare port 82 may be used for an additional drop port 38 or the pass-through port 40, or an additional pass-through port 40. In this manner, optical coupling according to a port mapping scheme may be established between certain of the optical fibers of the branch cable 24 in the interior cavity 72 and to the branch cable 24 that extends between optical connection terminals.

Many other modifications and embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A fiber optic network device comprising:
   an input port adapted to receive a multi-fiber cable having active optical fibers designated in a consecutive sequence;
   a first plurality of optical fibers in sequence in the consecutive sequence disposed within the fiber optic network device and extending from the input port, wherein the first plurality of optical fibers align to a first section of the consecutive sequence;
   a second plurality of optical fibers in sequence in the consecutive sequence disposed within the fiber optic network device and extending from the input port, wherein the second plurality of optical fibers align to a second section of the consecutive sequence;
   a plurality of drop ports opening into the fiber optic network device, wherein the plurality of drop ports are adapted to optically couple ones of the first plurality of optical fibers to at least one drop cable external to the fiber optic network device according to a first port mapping scheme; and,
   a pass-through port wherein the pass-through port is adapted to optically couple the second plurality of optical fibers to a second fiber optic network device through a multi-fiber adapter having a plurality of connection ports, and wherein the second plurality of optical fibers optically connect to the plurality of connection ports in a central alignment at the pass-through port according to a second port mapping scheme.

2. The fiber optic network device of claim 1, wherein the first section comprises a first four optical fibers in sequence in the consecutive sequence.

3. The fiber optic network device of claim 2, wherein the second section comprises a next eight optical fibers in sequence adjacent the first section in the consecutive sequence.

4. The fiber optic network device of claim 2, wherein the second section comprises a next four optical fibers in sequence adjacent the first section in the consecutive sequence.

5. The fiber optic network device of claim 1, wherein the first section comprises a first six optical fibers in sequence in the consecutive sequence.

6. The fiber optic network device of claim 5, wherein the second section comprises a next six optical fibers in sequence adjacent the first section in the consecutive sequence.

7. The fiber optic network device of claim 1, further comprising a third plurality of optical fibers disposed within the fiber optic network device and extending from the input port, wherein the third plurality of optical fibers align to a third section of the consecutive sequence.

8. The fiber optic network device of claim 7, wherein the first section comprises a first four optical fibers in sequence in the consecutive sequence.

9. The fiber optic network device of claim 7, wherein the second section comprises a next four optical fibers in sequence adjacent the first section in the consecutive sequence.

10. The fiber optic network device of claim 7, wherein the third section comprises a next four optical fibers in sequence adjacent the second section in the consecutive sequence.

11. The fiber optic network device of claim 1, wherein the first section comprises first in sequence four optical fibers in the consecutive sequence, and wherein a first one of the plurality of drop ports optically couples two of the first four optical fibers to a first two drop cables through a multi-fiber adapter seated in the first one of the plurality of drop ports.

12. The fiber optic network device of claim 11, wherein a second one of the plurality of drop ports optically couples the other two of the first four optical fibers to a second two drop cables, through a multi-fiber adapter seated in the second one of the plurality of drop ports.

13. A fiber optic network, comprising:
    a first fiber optic network device, comprising a terminal field having a plurality of connection ports in a consecutive sequence, wherein the connection ports are adapted to receive and terminate optical fibers; and
    a second fiber optic network device, comprising,
       an input port adapted to receive a first multi-fiber cable having active optical fibers in the consecutive sequence;
       a first plurality of optical fibers in sequence in the consecutive sequence disposed within the second fiber optic network device and extending from the input port, wherein the first plurality of optical fibers align to a first section of the consecutive sequence;
       a second plurality of optical fibers in sequence in the consecutive sequence disposed within the second fiber optic network device and extending from the input port, wherein the second plurality of optical fibers align to a second section of the consecutive sequence;
       a third plurality of optical fibers in sequence in the consecutive sequence disposed within the second fiber optic network device and extending from the input port, wherein the third plurality of optical fibers align to a third section of the consecutive sequence;
       a first plurality of drop ports opening into the second fiber optic network device, wherein the plurality of drop ports are adapted to optically couple ones of the first plurality of optical fibers to at least one drop cable external to the second fiber optic network device according to a first port mapping scheme; and,
       a first pass-through port wherein the first pass-through port is adapted to optically couple the second plurality of optical fibers to a third fiber optic network device through a multi-fiber adapter having a plurality of connection ports, and wherein the second plurality of optical fibers optically connect to the plurality of connection ports in a central alignment at the first pass-through port according to a second port mapping scheme;

a second pass-through port wherein the second pass-through port is adapted to optically couple the third plurality of optical fibers to a fourth fiber optic network device through a multi-fiber adapter having a plurality of connection ports, and wherein the third plurality of optical fibers optically connect to the plurality of connection ports in a central alignment at the second pass-through port according to a third port mapping scheme.

14. The fiber optic network of claim 13, wherein the first plurality of optical fibers comprises four optical fibers, and wherein each of the four optical fibers extend to respective ones of the plurality of drop ports.

15. The fiber optic network of claim 13, wherein the first plurality of optical fibers comprises six optical fibers, and wherein each of the six optical fibers extend to respective ones of the plurality of drop ports.

16. The fiber optic network of claim 13, wherein a pair of the first plurality of optical fibers extend to one of the plurality of drop ports.

17. The fiber optic network of claim 16, wherein the pair of the first plurality of optical fibers extend to one of the plurality of drop ports.

18. The fiber optic network of claim 13, wherein the third fiber optic network device, comprises,
- an input port adapted to receive a multi-fiber cable;
- a fourth plurality of optical fibers disposed within the third fiber optic network device and extending from the input port, wherein the fourth plurality of optical fibers align to the second section of the consecutive sequence;
- a second plurality of drop ports opening into the third fiber optic network device, wherein the second plurality of drop ports are adapted to optically couple ones of the fourth plurality of optical fibers to at least one drop cable external to the third fiber optic network device, according to a fourth port mapping scheme.

19. The fiber optic network of claim 18, wherein the fourth fiber optic network device, comprises,
- an input port adapted to receive a multi-fiber cable;
- a fifth plurality of optical fibers disposed within the fourth fiber optic network device and extending from the input port, wherein the fifth plurality of optical fibers align to the third section of the consecutive sequence;
- a third plurality of drop ports opening into the fourth fiber optic network device, wherein the third plurality of drop ports are adapted to optically couple ones of the fifth plurality of optical fibers to at least one drop cable external to the fourth fiber optic network device, according to a fifth port mapping scheme.

20. The fiber optic network of claim 19, wherein the fourth port mapping scheme and the fifth port mapping scheme are the same.

21. A fiber optic network, comprising:
a first fiber optic network device, comprising a terminal field having a plurality of connection terminals in a consecutive sequence, wherein the connection terminals are adapted to receive and terminate optical fibers in the consecutive sequence;
a second fiber optic network device, comprising,
  an input port adapted to receive a first multi-fiber cable having active optical fibers in the consecutive sequence;
  a first plurality of optical fibers disposed within the fiber optic network device and extending from the input port, wherein the first plurality of optical fibers align to a first section of the consecutive sequence;
  a second plurality of optical fibers disposed within the fiber optic network device and extending from the input port, wherein the second plurality of optical fibers align to a second section of the consecutive sequence;
  a first plurality of drop ports opening into the fiber optic network device, wherein the plurality of drop ports are adapted to optically couple ones of the first plurality of optical fibers to at least one drop cable external to the fiber optic network device according to a first port mapping scheme; and,
  a first pass-through port wherein the first pass-through port is adapted to optically couple the second plurality of optical fibers to a second fiber optic network device through a multi-fiber adapter having a plurality of connection ports, and wherein the second plurality of optical fibers optically connect to the plurality of connection ports in a central alignment at the first pass-through port according to a second port mapping scheme; and
a third fiber optic network device, comprising,
  an input port adapted to receive a multi-fiber cable;
  a third plurality of optical fibers disposed within the third fiber optic network device and extending from the input port, wherein the third plurality of optical fibers align to a third section of the consecutive sequence;
  a fourth plurality of optical fibers disposed within the third fiber optic network device and extending from the input port, wherein the fourth plurality of optical fibers align to a fourth section of the consecutive sequence;
  a second plurality of drop ports opening into the third fiber optic network device, wherein the second plurality of drop ports are adapted to optically couple ones of the third plurality of optical fibers to at least one drop cable external to the third fiber optic network device, according to a third port mapping scheme; and,
  a second pass-through port wherein the second pass-through port is adapted to optically couple the second plurality of optical fibers to a fourth fiber optic network device through a multi-fiber adapter having a plurality of connection ports, and wherein the fourth plurality of optical fibers optically connect to the plurality of connection ports in a central alignment at the second pass-through port according to a fourth port mapping scheme.

22. A method of installing fiber optic network devices in a fiber optic network, comprising:
providing a first fiber optic network device comprising a terminal field having a plurality of connection terminals, wherein the connection terminals are adapted to receive and terminate optical fibers;
providing a second fiber optic network device having a first plurality of drop ports, wherein the first plurality of drop ports are adapted to optically couple ones of a first plurality of optical fibers disposed in the second fiber optic network device to at least one drop cable external to the second fiber optic network device according to a first port mapping scheme;
terminating at the connection terminal the first plurality of optical fibers;
activating optical signaling between the connection terminal and the first plurality of drop ports through the first plurality of optical fibers;

providing a third fiber optic network device having a second plurality of drop ports, wherein the second plurality of drop ports are adapted to optically couple ones of a second plurality of optical fibers disposed in the third fiber optic network device to at least one drop cable external to the third fiber optic network device;

terminating at the connection terminal the second plurality of optical fibers while the optical signaling between the connection terminal and the first plurality of drop ports is active; and activating optical signaling between the connection terminal and the second plurality of drop ports through the second plurality of optical fibers.

23. The method of claim 22, wherein the first plurality of optical fibers align to a first section of the consecutive sequence.

24. The method of claim 22, wherein the first plurality of drop ports are adapted to optically couple the ones of the first plurality of optical fibers according to a first port mapping scheme.

25. The method of claim 22, wherein the second plurality of optical fibers align to a second section of the consecutive sequence.

26. The method of claim 22, wherein the second plurality of drop ports are adapted to optically couple the ones of the second plurality of optical fibers according to a second port mapping scheme.

* * * * *